United States Patent
Kouznetsov et al.

(10) Patent No.: US 6,970,697 B2
(45) Date of Patent: *Nov. 29, 2005

(54) PLATFORM-INDEPENDENT SCANNING SUBSYSTEM API FOR USE IN A MOBILE COMMUNICATION FRAMEWORK

(75) Inventors: Victor Kouznetsov, Aloha, OR (US); Davide Libenzi, Hillsboro, OR (US); Michael C. Pak, Portland, OR (US); Yasutaka Urakawa, Yokohama (JP); Kenji Ishii, Yokohama (JP); Masanori Fujita, Yokohama (JP)

(73) Assignees: NTT DoCoMo, Inc., Tokyo (JP); Networks Associates Technology, Inc., Santa Clara, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 10/639,136

(22) Filed: Aug. 11, 2003

(65) Prior Publication Data

US 2004/0209609 A1 Oct. 21, 2004

Related U.S. Application Data

(60) Provisional application No. 60/463,842, filed on Apr. 17, 2003.

(51) Int. Cl.[7] .................. H04M 3/00; H04Q 7/20
(52) U.S. Cl. ................ 455/418; 455/419; 455/420; 455/424; 455/425; 709/219; 709/220; 717/168
(58) Field of Search .................. 455/418, 419, 455/420, 422.1; 713/167, 166, 200, 201; 709/219, 220; 717/168

(56) References Cited

U.S. PATENT DOCUMENTS

| | | | |
|---|---|---|---|
| 6,269,254 B1 * | 7/2001 | Mathis | 455/557 |
| 6,792,543 B2 * | 9/2004 | Pak et al. | 713/200 |
| 2001/0014907 A1 * | 8/2001 | Brebner | 709/202 |
| 2002/0072347 A1 * | 6/2002 | Dunko et al. | 455/414 |
| 2002/0183051 A1 * | 12/2002 | Poor et al. | 455/418 |
| 2003/0074581 A1 * | 4/2003 | Hursey et al. | 713/201 |
| 2003/0079145 A1 * | 4/2003 | Kouznetsov et al. | 713/200 |
| 2003/0093409 A1 * | 5/2003 | Weil et al. | 707/3 |
| 2003/0134629 A1 * | 7/2003 | Ollis et al. | 455/419 |
| 2004/0025042 A1 * | 2/2004 | Kouznetsov et al. | 713/200 |
| 2004/0209608 A1 * | 10/2004 | Kouznetsov et al. | 455/418 |
| 2004/0210645 A1 * | 10/2004 | Kouznetsov et al. | 709/220 |
| 2004/0210891 A1 | 10/2004 | Kouznetsov et al. | |

OTHER PUBLICATIONS

Copy of Search Report from application No. PCT/US04/10482 which was mailed on Apr. 20, 2005.*
Copy of Office Action Summary from U.S. Appl. No. 10/639,088 which was mailed Dec. 16, 2004.
Copy of Office Action Summary from U.S. Appl. No. 10/639,009 which was Mailed Oct. 22, 2004.

* cited by examiner

*Primary Examiner*—Emmanuel L. Moise
*Assistant Examiner*—Kamran Afshar
(74) *Attorney, Agent, or Firm*—Zilka-Kotab, PC; Christopher J. Hamaty

(57) ABSTRACT

A platform-independent system and associated method are provided for use with a mobile communication device. Included is a mobile communication device capable of communicating via a wireless network. Such mobile communication device includes an operating system installed thereon. Associated therewith is a platform-independent scanning subsystem in communication with the operating system of the mobile communication device for scanning purposes. Further provided is a platform-independent application program interface for interfacing the operating system and the scanning subsystem. The platform-independent application program interface includes an abstract library for porting the platform-independent scanning subsystem to the mobile communication device and associated operating system.

32 Claims, 15 Drawing Sheets

1000

| Data Type | Meaning | Format | Description |
|---|---|---|---|
| MDO_DTYPE_HTML | HTML | TEXT | Scan for malicious content in HTML |
| MDO_DTYPE_URL | URL | *url-string* | Scan for URL with malicious content |
| MDO_DTYPE_EMAIL | E-mail Address | *email-string* | Scan for email-address with malicious intent |
| MDO_DTYPE_PHONE | Phone number | *phone-number* | Scan for phone number with malicious intent |
| MDO_DTYPE_JAVA | JAVA | binary | Scan for malicious JAVA code |
| MDO_DTYPE_TEXT | text data | n/a | Scan text data for malicious content |
| MDO_DTYPE_UNKNOWN | unknown | unknown | Scan for all malware types |

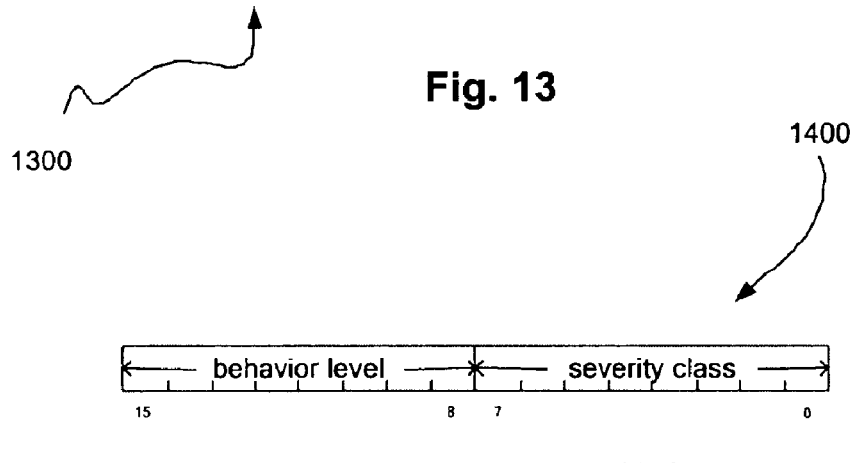

bits 31-16 are reserved

Fig. 14

| Terminal Application | Data to be Scanned | Scan Data Type | Scan Timing ● - mandatory[1]  o - optional | | | | |
|---|---|---|---|---|---|---|---|
| | | | after receiving | before storing | before rendering | before invoking other app | other timing |
| Browser | URL | URL | | | | | ●[2] |
| | HTML | HTML | o | o | ● | | |
| | strings embedded in HTML | mail address, phone number, URL | | | | o | |
| Mailer | mail address | e-mail address | | | | | ●[3] |
| | | phone number | | | | | ●[3] |
| | message HTML | HTML | o | o | ● | | o[3] |
| | strings embedded in mail text | mail address, phone number, URL | | | | o | |
| Message R/F | message text | HTML | o | o | ● | | |
| | message HTML | HTML | o | o | ● | | |
| | special strings embedded in message | mail address, phone number, URL | | | | o | |
| Java VM | Java | Java | o | o | | | ●[4] |
| | special strings in JAVA | mail address, phone number, URL | | | | o | |
| Data Exchange | HTML, text, JAVA | HTML, text, JAVA | o | o | | | o[5] |
| | special strings embedded in data | mail address, phone number, URL | o | o | | | o[6] |
| Phone | phone number | phone number | | | | | ●[7] |
| Others (e.g. scheduler) | HTML, text, JAVA | HTML, text, JAVA | | o | o | | |
| | special strings embedded in data | mail address, phone number, URL | o | o | o | o | |

1500

[1] specified applications data is to be scanned at the mandatory instances
[2] before HTTP request is made
[3] before sending a message
[4] before activation
[5] before sending data
[6] before sending data
[7] before calling

Fig. 15

PLATFORM-INDEPENDENT SCANNING SUBSYSTEM API FOR USE IN A MOBILE COMMUNICATION FRAMEWORK

This Application claim priority from U.S. Provisional Patent Applications Ser. No. 60/463,842 filed on Apr. 17, 2003.

FIELD OF THE INVENTION

The present invention relates to mobile communication device security, and more particularly to scanning mobile communication devices for malware.

BACKGROUND OF THE INVENTION

The last decade has seen a rapid growth in the number and use of mobile cellular telephones. More recently, wireless devices have been introduced which combine the functionality of mobile telephones and Personal Digital Assistants (PDAs). It is expected that this area will undergo massive growth in the near future as new cellular telecommunication standards (i.e. GPRS, UMTS, and WAP) make possible the high speed transfer of data across the wireless interface.

It can be expected that such platforms will be susceptible to attack from so-called "malware" such as viruses, Trojan horses, and worms (referred to collectively hereinafter as "viruses"); and other unwanted/harmful content in much the same way as present day personal computers and workstations are susceptible. A number of mobile telephone viruses have already been identified.

In order to resist virus attacks, anti-virus software must be deployed into mobile platforms in much the same way as it has been deployed in the desktop environment. A number of different desktop anti-virus applications are currently available. The majority of these applications rely upon a basic scanning engine which searches suspect files for the presence of predetermined virus signatures. These signatures are held in a database which must be constantly updated to reflect the most recently identified viruses.

Typically, users download replacement databases every so often, either over the Internet, from a received e-mail, or from a CDROM or floppy disk. Users are also expected to update there software engines every so often in order to take advantage of new virus detection techniques which may be required when a new strain of virus is detected.

Mobile wireless platforms present a series of problems for software developers (including developers of anti-virus software). In particular, mobile wireless platforms are traditionally not standardized like conventional desktops. For example, instead of running Microsoft™ Windows™, such mobile wireless platforms may have installed thereon a variety of types of operating systems. This and various other lack of standardization complicates the act of designing an anti-virus scanner that is capable of operating on any one of a plurality of mobile wireless platforms.

DISCLOSURE OF THE INVENTION

A platform-independent system and associated method are provided for use with a mobile communication device. Included is a mobile communication device capable of communicating via a wireless network. Such mobile communication device includes an operating system installed thereon. Associated therewith is a platform-independent scanning subsystem in communication with the operating system of the mobile communication device for scanning purposes. Further provided is a platform-independent application program interface for interfacing the operating system and the scanning subsystem. The platform-independent application program interface includes an abstract library for porting the platform-independent scanning subsystem to the mobile communication device and associated operating system.

In one embodiment, the application program may include a mail application program, a browser application program, a phone book application program, a message application program, and/or a Java application program.

In another embodiment, the abstract library may support system initialization, library initialization, error functions, memory allocation, input/output (I/O), data authentication, synchronization, hypertext transfer protocol, shared memory, system time, device information, and/or debugging.

BRIEF DESCRIPTION OF THE DRAWINGS

FIG. 13 illustrates various exemplary scan data types which the application programs are capable of communicating to the scanning subsystem via an API.

FIG. 14 shows a bit-field variable containing malware severity flags and application program behavior levels, in accordance with one exemplary embodiment.

FIG. 15 illustrates a chart setting forth the manner in which the timing of scanning by the scanning subsystem varies as a function of the data types identified via the variables of FIG. 13.

DETAILED DESCRIPTION

Figure 1:
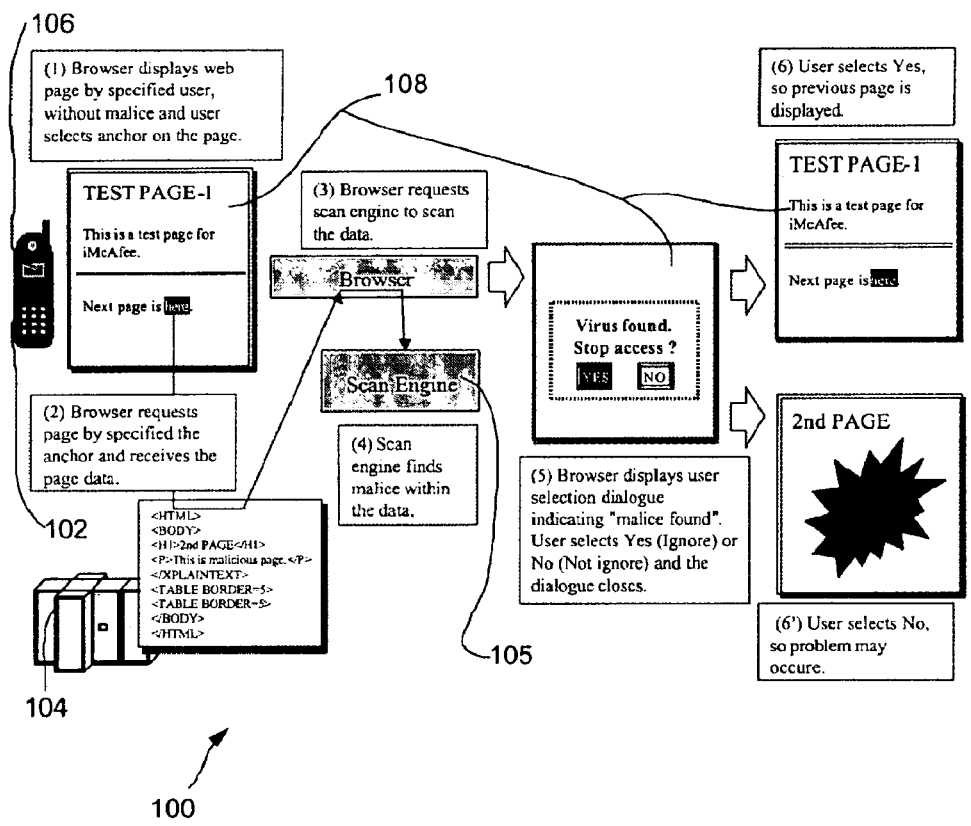
FIG. 1 illustrates a mobile communication framework, in accordance with one embodiment.

FIG. 1 illustrates a mobile communication framework 100, in accordance with one embodiment. As shown, included are a mobile communication device 102 and a backend server 104 capable of communicating via a wireless network. In the context of the present description, the mobile communication device 102 may include, but is not limited to a cellular telephone, a wireless personal digital assistant (PDA), a wireless hand-held computer, a wireless portable computer or any other mobile device capable of communication via a wireless network.

In one embodiment, the mobile communication device 102 may be equipped with a scanning subsystem 105. Such scanning subsystem 105 may include any subsystem capable of scanning data that is either stored on the mobile communication device 102 or in communication therewith. Of course, such scanning may refer to on-access scanning, on-demand scanning, or any other type of scanning. Moreover, the scanning may involve content (i.e. text, pictures, etc.) represented by the aforementioned data, general security-type scanning for malware, etc.

With continuing reference to FIG. 1, the mobile communication device 102 may be further equipped with a display 106 capable of depicting a plurality of graphical user interfaces 108 adapted for managing various functionality including the aforementioned scanning functionality.

In use, the display 106 of the mobile communication device 102 is used to display data on a network (i.e. the Internet, etc.). See operation 1. In the present course of use, the user may use the display 106 to browse various data on the network by selecting link or anchors for retrieving the data from the network via the backend server 104. See operation 2. Next, in operation 3, the scanning subsystem 105 is called to scan the retrieved data.

In the present instance, the scanning subsystem 105 is shown to have located malware in association with the retrieved data in operation 4. At this point, a user is provided with an option via the display 106 to either halt the retrieval and/or use/access the data regardless of the identified malware. Note operation 5. Based on the decision in operation 5, the user may or may not be the subject of an "attack," as indicated in operation 6.

Figure 2:
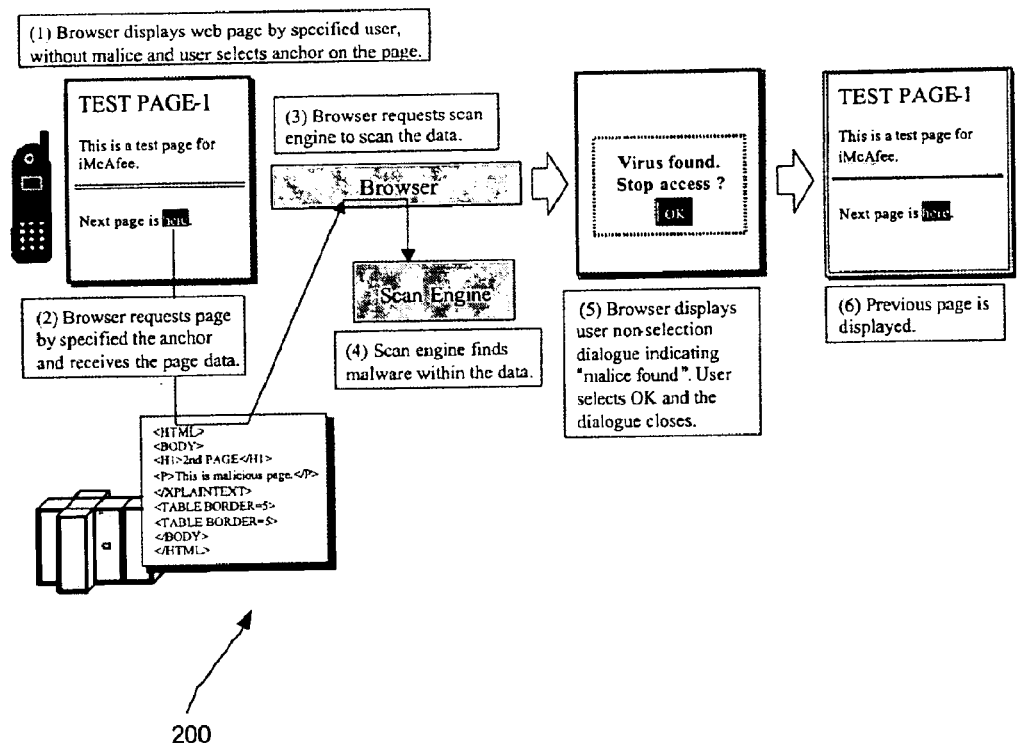
FIG. 2 illustrates a mobile communication framework, in accordance with another embodiment.

FIG. 2 illustrates a mobile communication framework 200, in accordance with another embodiment. The present mobile communication framework 200 is similar to the mobile communication framework 100 of FIG. 1 with the exception of the manner in which the mobile communication device reacts to the identification of malware in retrieved data.

In particular, the user is only provided with one option in operation 5. That is, the user is capable of only closing any dialogue associated with the data found to incorporate malware. Note operation 6.

Figure 3:
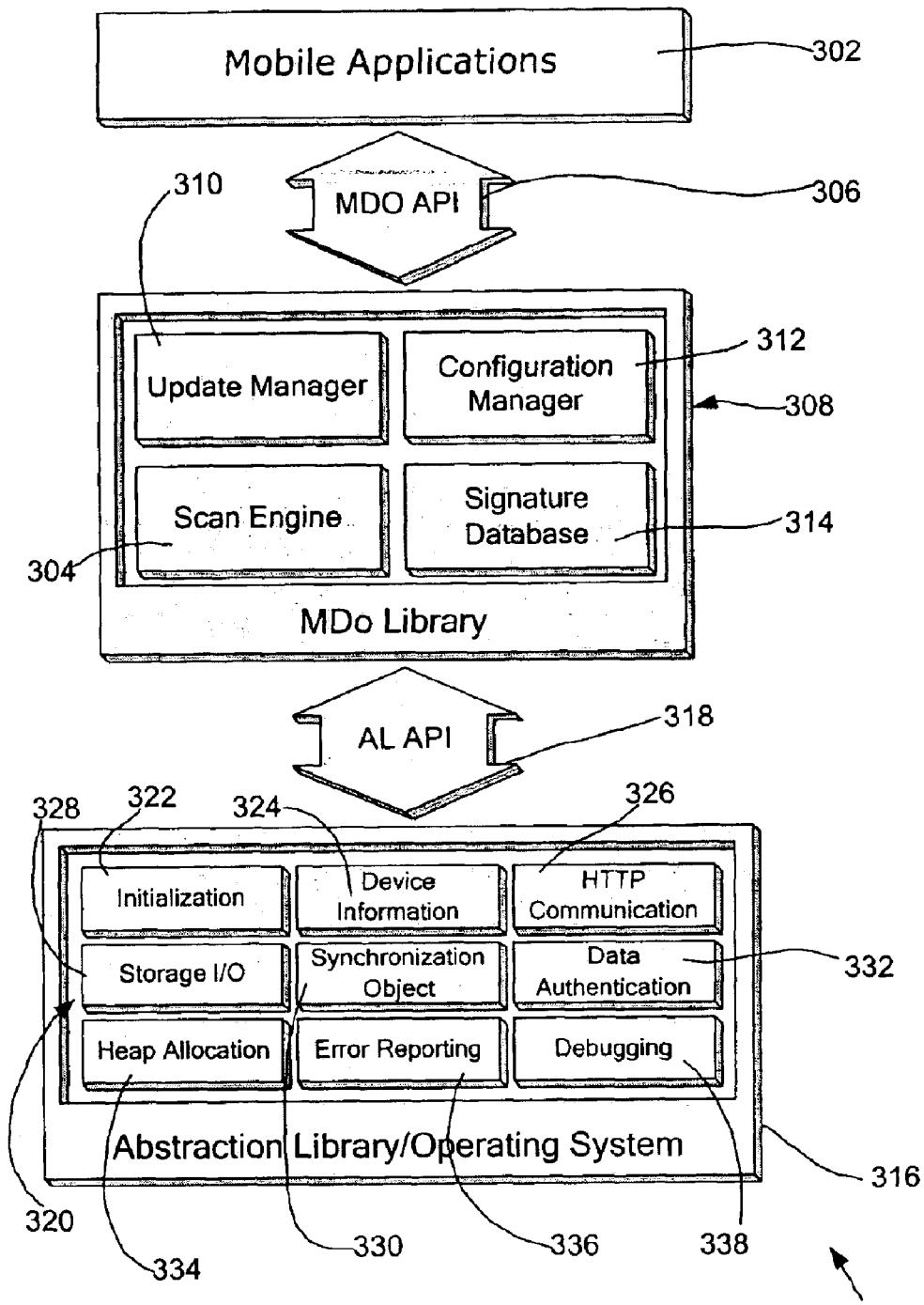
FIG. 3 illustrates an architecture associated with a mobile communication device, in accordance with one embodiment.

FIG. 3 illustrates an architecture 300 associated with a mobile communication device, in accordance with one embodiment. The present architecture 300 may be incorporated into the mobile communication devices of FIGS. 1 and 2. Of course, the architecture 300 may be implemented in any desired context.

As shown, the present architecture 300 may include a plurality of mobile application programs 302. In the context of the present description, the mobile application programs 302 may include any application program, software, etc. installed on a mobile communication device for carrying out various tasks. It should be further noted that such application programs 302 may also be implemented in firmware, hardware, etc. per the desires of the user.

In another embodiment, the application programs 302 may include, but are not limited to a mail application program, where the tasks include managing electronic mail. Further, the application program may include a browser application program, where the tasks include browsing a network. Still yet, the application program may include a phone book application program, where the tasks include managing a plurality telephone numbers. As an option, the application program may include a message application program, where the tasks include communicating messages. It should be noted that any type of application program may be included. For example, a Java application program or the like may be included.

With continuing reference to FIG. 3, a scanning subsystem 304 resides in communication with the application programs 302 via a first application program interface (API) 306 and a first library 308 associated with the scanning subsystem 304. More information regarding optional exemplary details relating to the first application program interface 306 and the first library 308 will be set forth later in greater detail during reference to FIGS. 4–12.

As an option, the application programs 302 may communicate information to the scanning subsystem 304 to facilitate the scanning by the scanning subsystem 304. Such information may relate to the type of data to be scanned, and the timing associated with such scanning. More exemplary information regarding the way in which the scanning subsystem 304 interacts with the application programs 302 in such a manner will be set forth during reference to FIGS. 13–15.

As shown in FIG. 3, the first library 308 may include an update manager 310, a configuration manager 312, and a signature database 314. In use, the update manager 310 may manage the process with which the signature database 314 is updated with the latest signatures for scanning purposes. In one embodiment, the update process may be streamlined to accommodate the limited bandwidth inherent in mobile communication frameworks. More exemplary information regarding such update process will be set forth during reference to FIGS. 16–17.

Further provided as a component of the architecture 300 of FIG. 3 is an operating system 316 installed on the mobile communication device and adapted for executing the application programs 302. In one embodiment, the scanning subsystem 304 may be platform-independent, and thus be capable of being implemented on any type of operating system/mobile communication device combination.

To accommodate this feature, a second application program interface 318 and a second library 320 capable of supporting various functionality such as system/library initialization 322, error functions 336, memory allocation 334, input/output (I/O) 328, data authentication 332, synchronization 330, hypertext transfer protocol 326, device information 324, debugging 338, and other functionality (i.e. shared memory, system time, etc.). In one embodiment, the second application program interface 318 may be platform independent, similar to the scanning subsystem 304. More information regarding optional exemplary details relating to the second application program interface 318 and the second library 320 will be set forth later in greater detail during reference to Appendix A.

Figure 4:
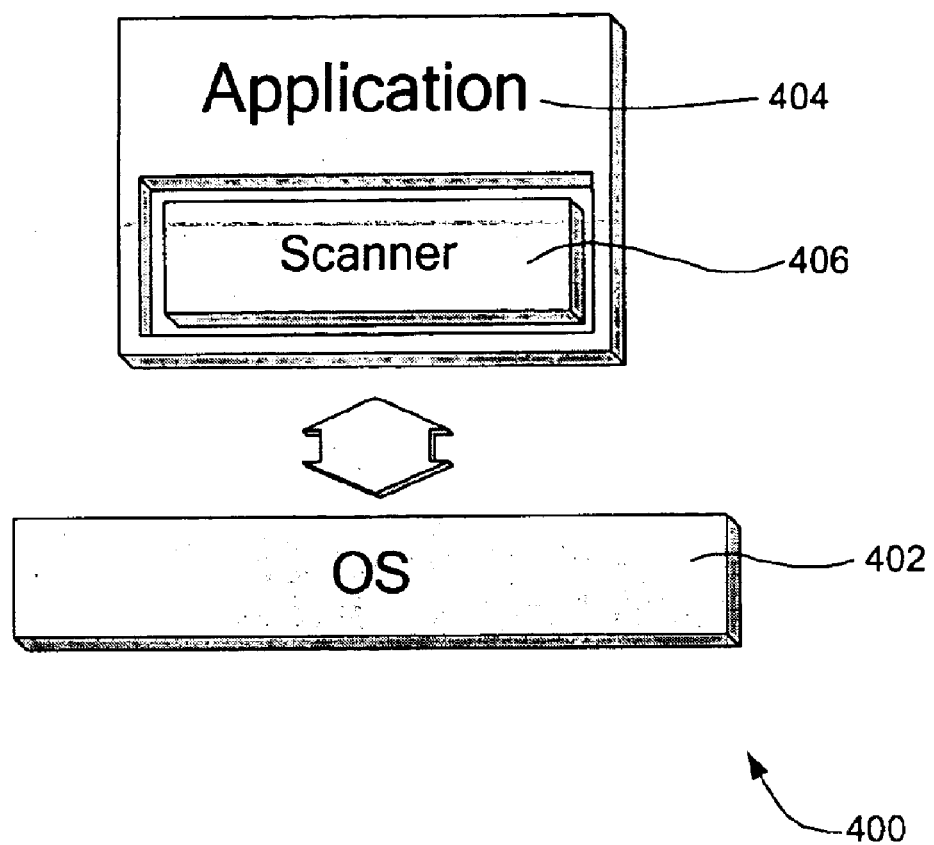
FIG. 4 shows a system for accessing security or content analysis functionality utilizing a mobile communication device, in accordance with one embodiment.

FIG. 4 shows a system 400 for accessing security or content analysis functionality utilizing a mobile communication device, in accordance with one embodiment. In one example, the present system 400 may be implemented in the context of the application programs, scanning subsystem, and operating system of the architecture 300 of FIG. 3. It should be noted, however, that the present system 400 may be implemented in any desired context.

As shown, included is an operating system 402 installed on a mobile communication device capable of communicating via a wireless network. Further provided is an application program 404 installed on the mobile communication device and executed utilizing the operating system 402 for performing tasks.

A scanning subsystem 406 remains in communication with the application program 404 via an application program interface and an associated library (see, for example, the first application program interface 306 and first library 308 of FIG. 3). Such scanning subsystem 406 is adapted for accessing security or content analysis functionality in conjunction with the tasks performed by the application program 404. In one embodiment, the security or content analysis may include security analysis. In another embodiment, the security or content analysis may include content analysis. Still yet, the security or content analysis may include on-demand virus scanning and/or on-access virus scanning.

In use, the security or content analysis functionality may be applied to application data associated with the tasks performed by the application program 404. In the context of the present description, the application data may include any data input, processed, output, or otherwise associated with the performance of the tasks carried out by the application program 404.

By the tight coupling of the scanning subsystem 406 and application program 404 via the application program interface, less overhead and code redundancies are required. More exemplary information regarding such application program interface and the associated library will be set forth hereinafter in greater detail during reference to subsequent figures.

Figure 5:
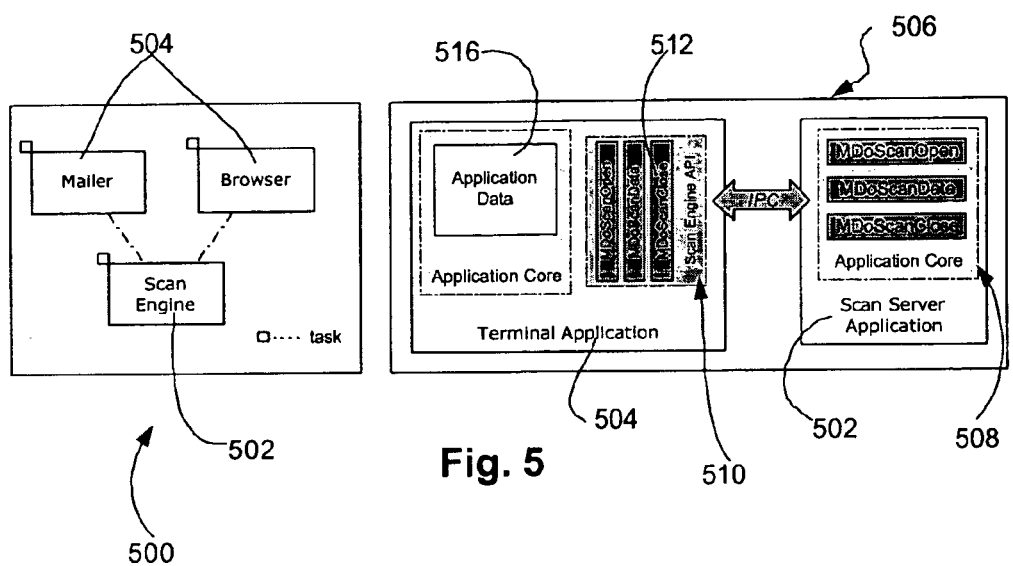
FIG. 5 shows a framework for accessing security or content analysis functionality utilizing a mobile communication device, in accordance with an application server embodiment of the system of FIG. 4.

FIG. 5 shows a framework 500 for accessing security or content analysis functionality utilizing a mobile communication device, in accordance with an application server embodiment of the system 400 of FIG. 4. It should be noted that the present framework 500 may be implemented in any desired context.

As shown, the scanning subsystem may include a scanning program 502 that communicates with the application program 504 via the application program interface 506 and an associated protocol (i.e. ultron messaging system). As will be set forth in greater detail later, the application program interface 506 may involve a first component 508 associated with the scanning program 502 and a second component 510 associated with the application program 504.

Various calls 512 provided with the application program interface 506 may include an open call, a data call, and a close call. In use, the scanning program 502 may scan application data 516 associated with the tasks performed by the application program 504.

Figure 6:
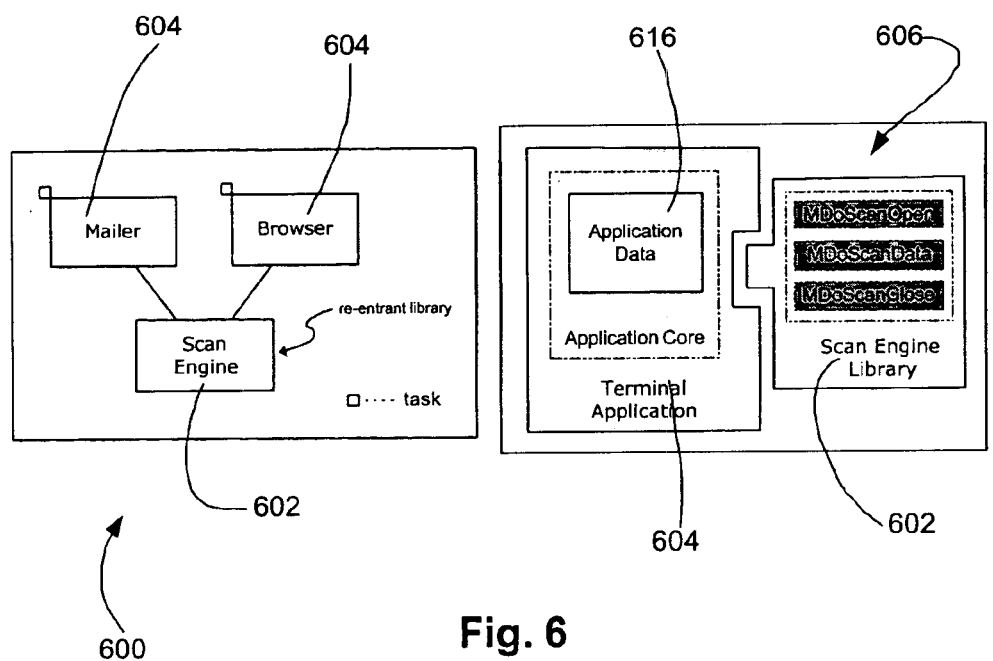
FIG. 6 shows a framework for accessing security or content analysis functionality utilizing a mobile communication device, in accordance with a re-entrant library embodiment of the system of FIG. 4.

FIG. 6 shows a framework 600 for accessing security or content analysis functionality utilizing a mobile communication device, in accordance with a re-entrant library embodiment of the system 400 of FIG. 4. It should be noted that the present framework 600 may be implemented in any desired context.

As shown, the scanning subsystem may include a re-entrant library 602. In use, the scanning subsystem re-entrant library 602 may be linked to an application program 604 at run-time. Thus, an application program interface 606 may be populated into each of a plurality of application programs 604.

Similar to the previous framework 500 of FIG. 5, the application program interface 606 may involve various calls 612 including an open call, a data call, and a close call. In use, the re-entrant library 602 may be used to scan application data 616 associated with the tasks performed by the application program 604.

Figure 7:
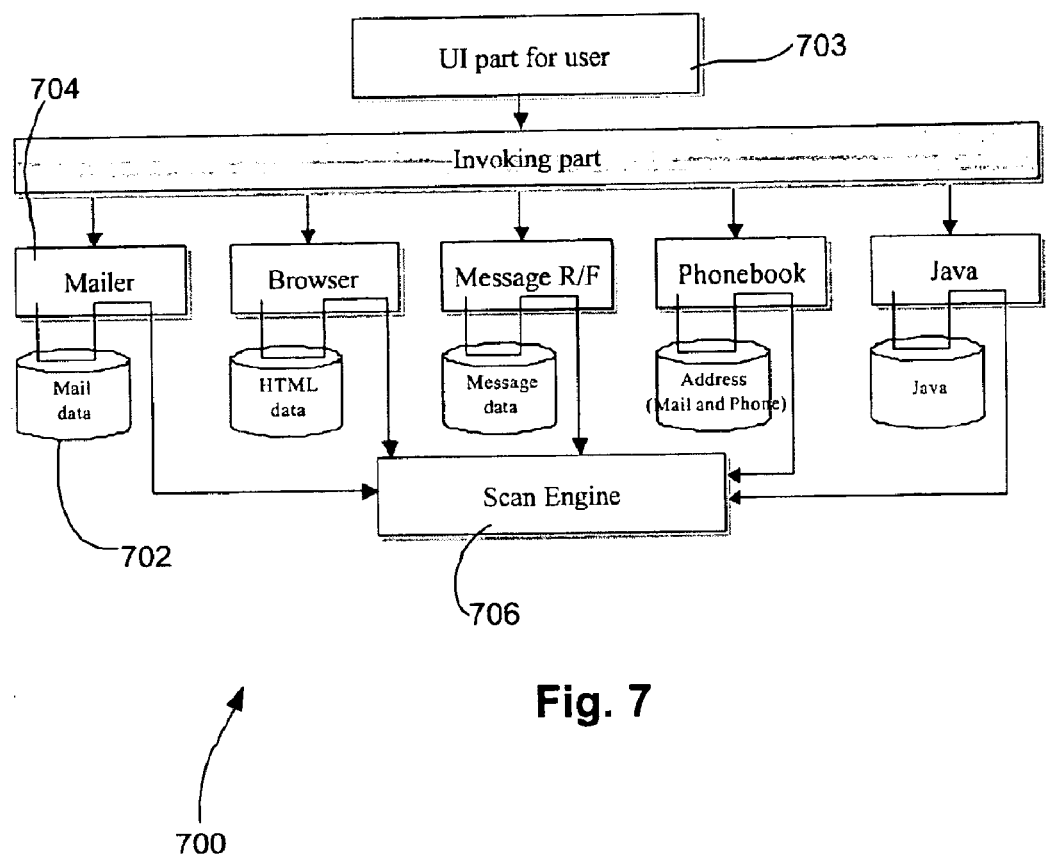
FIG. 7 shows an on-demand scanning system implemented in the context of the system of FIG. 4.

FIG. 7 shows an on-demand scanning system 700 implemented in the context of the system 400 of FIG. 4. It should be noted that the present system 700 may be implemented in any desired context.

On-demand scanning provides scanning of stored application data 702 for malicious content or code for removal. The user may initiate on-demand scanning via a user interface 703. Moreover, each application program 704 may call a scanning subsystem 706 to perform scanning of objects stored in the corresponding memory.

On the other hand, on-access scanning provides identification of malicious code or content before the application program 704 processes or renders the application data 702. The on-access scanning is transparent to the user until the scanning subsystem 706 detects malicious application data 702.

Figure 8:
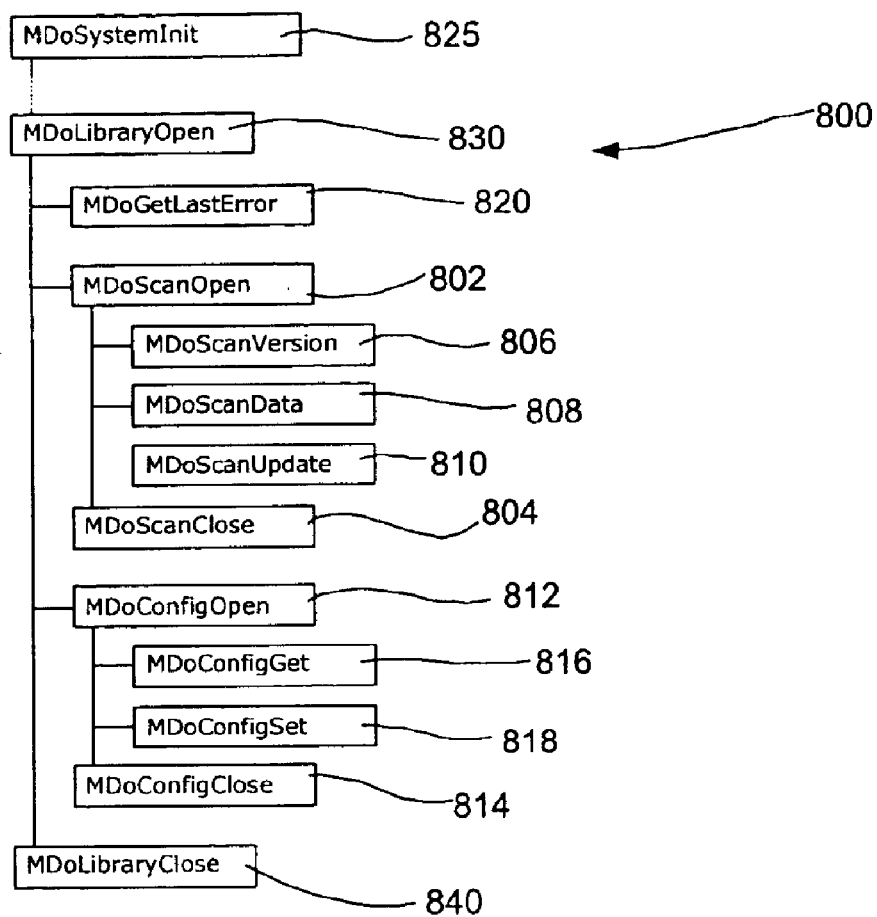
FIG. 8 shows a hierarchy of various components of an application program interface (API) which may be used to interface mobile application programs and a scanning subsystem, in accordance with one embodiment.

FIG. 8 shows a hierarchy of various components of an application program interface 800 which may be used to interface mobile application programs and a scanning subsystem, in accordance with one embodiment. As an option, the present application program interface 800 may be implemented in the context of the system 400 of FIG. 4. It should be noted, however, that the present application program interface 800 may be implemented in any desired context.

As shown in FIG. 8, the application program interface functions include MDoScanOpen( ) 802, MDoScanClose( ) 804, MDoScanVersion( ) 806, and MDoScanData( ) 808. MoDoScanOpen( ) 802 and MDoScanClose( ) 804 are used to create/open and close a scanning subsystem object instance. MDoScanVersion( ) 806 provides scanning subsystem and signature pattern data version information. MDoScanData( ) 808 performs content/data scanning and reporting. Also included in the scanner application program interface is MDoScanUpdate( ) 810 that provides malware signature database and detection logic updates. When MDoScanUpdate( ) 810 is called by an update application, the library connects to a remote back-end server (see, for example, FIG. 1) and downloads the latest files (i.e. mdo.sdb, mdo.pd).

Scanning subsystem configuration is done using the MDoConfigOpen( ) 812, MDoConfigClose( ) 814, MDoConfigGet( ) 816, and MDoConfigSet( ) 818. Once a configuration handle is obtained by calling the present application program interface 800, the calling application program uses the get and set configuration API to query and set scanning subsystem configuration variables.

Also included in the present application program interface 800 is an error retrieval function named MDoGetLastError( ) 820. This function is used to retrieve information about the last error that occurred.

Before any of the API calls are made, preferably at boot-time, MDoSystemInit( ) 825 is called to initialize the library environment settings. The library keeps configuration settings, malicious code detection logic (i.e. mdo.pd) and signature database (i.e. mdo.sdb), and internal variables (i.e. synchronization objects, etc.) at fixed persistent storage locations. MDoLibraryOpen( ) 830 and MDoLibraryClose( ) 840 are used to initialize the library. An application program may call MDoLibraryOpen( ) 830 before any other API calls are made, and the application program may call MDoLibraryClose( ) 840 before terminating.

The application program interface 800 may be capable of supporting various functionality such as system environment initialization, version status information retrieval, updating the scanning subsystem, scanning, configuring the scanning subsystem, etc. using various application program interface components. More information will now be set forth regarding the foregoing functionality in the context of the application program interface 800.

System Initialization

MDoSystemInit( ) 825 performs validation and environment initialization for data kept at specific persistent storage locations. A malicious code/content signature pattern database (i.e. mdo.sdb), detection logic (i.e. mdo.pd), configuration settings, and synchronization objects may be stored at these locations. MDoSystemInit( ) 825 may be called once (i.e. at boot-time) before any of the API functions are executed.

Table #1 illustrates exemplary information regarding MDoSystemInit( ) 825.

TABLE #1

MDoSystemInit
Description
Verify and initialize system environment information.
Prototype
int MDoSystemInit( void );
Parameters
none
Return Value
0 if successful, non-zero error code otherwise.

Library Interface API

Figure 9:
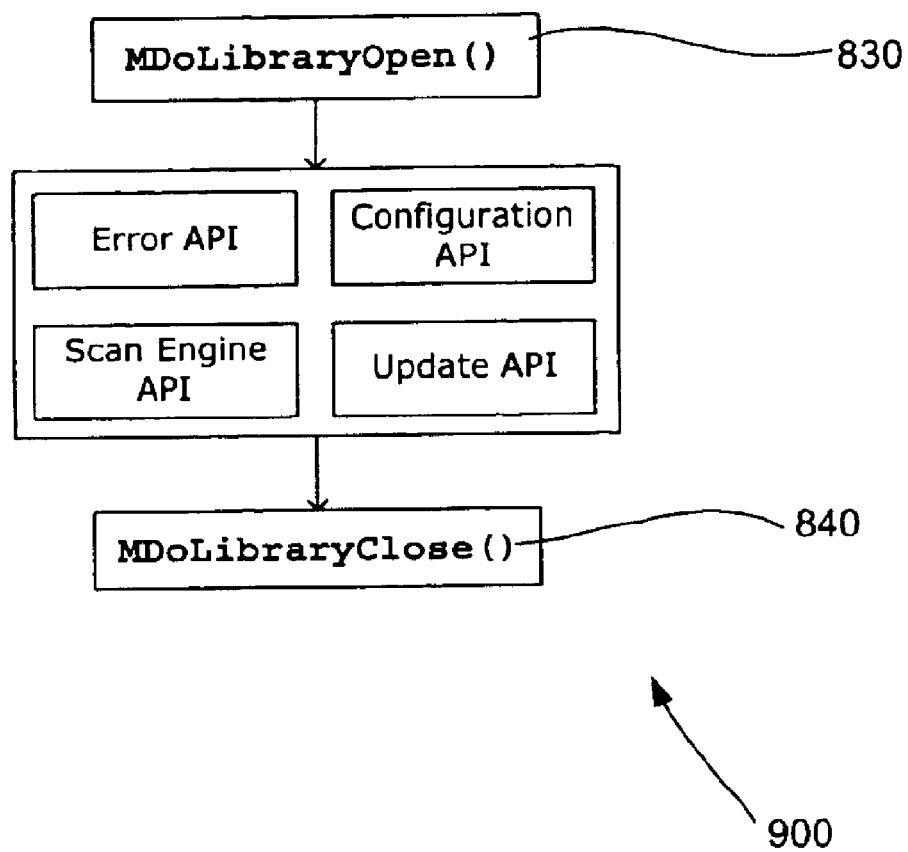
FIG. 9 illustrates an exemplary library interface initialization.

The application program interface 800 includes a plurality of library interface components. The API interface instantiation may be accomplished using MDoLibraryOpen( ) 830. The instantiated library interface handle obtained using this function may be used for subsequent API calls. Before the application program terminates, MDoLibraryClose( ) 840 may be called to release the handle. FIG. 9 illustrates an exemplary library interface initialization 900 utilizing MDoLibraryOpen( ) 830 and MDoLibraryClose( ) 840.

Table #2 illustrates exemplary information regarding MDoLibraryOpen( ) 830.

TABLE #2

MDoLibraryOpen
Description
Initializes and returns an API library interface handle.
Prototype
MDOLIB_HANDLE MDoLibraryOpen( void );
Parameters
none
Return Value
library interface handle if successful,
INVALID_MDOLIB_HANDLE otherwise.
See Also
MDoLibraryClose( )

Table #3 illustrates exemplary information regarding MDoLibraryClose( ) 840.

TABLE #3

MDoLibraryClose
Description
Releases system resource associated with an API library handle returned by the MDoLibraryClose( ) function.
Prototype
void MDoLibraryClose( MDOLIB_HANDLE hLib );
Parameter
hLib
[in] library handled returned by MDoLibraryOpen.
Return Value
none
See Also
MDoLibraryOpen( )

Error Retrieval

Once the library has been successfully initialized and instantiated by MDoLibraryOpen( ) 830, MDoGetLastError( ) 820 provides the application program with information about the last error occurred.

Table #4 illustrates exemplary information regarding MDoGetLastError( ) 820.

TABLE #4

MDoGetLastError
Description
Returns the specified library instance's last-error value.
Prototype
MDoErrorCode MDoGetLastError(MDOLIB_HANDLE hLib);
Parameters
hLib
[in] library handled returned by MDoLibraryOpen.

Return Value

Figure 10:
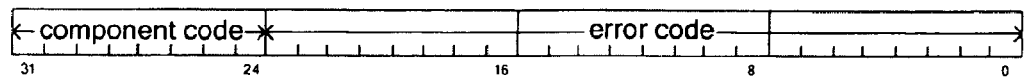
FIG. 10 illustrates an exemplary format of an error code functionality, in accordance with one embodiment.

The MDoErrorCode data type may be defined as a 32-bit unsigned integer which contains both component and error codes. Often times, the error information retrieved may be set at the platform abstraction API layer. For this reason, the MDoErrorCode format given herein is similar to AlError-Code format defined by the abstraction layer API (See Appendix A). FIG. 10 illustrates an exemplary format 1000 of MDoErrorCode, in accordance with one embodiment.

Table #5 illustrates exemplary information regarding MDoGetLastError( ) 820.

TABLE #5

MDoErrorCode is defined as:
typedef unsigned long MDoErrorCode;
See Also
MDoLibraryOpen( ), MDoScanOpen( ), MDoScanData( ),
MDoScanUpdate( )

Exemplary Computer Code #1 illustrates a sample library calling sequence with a call to MDoGetLastError( ) 820.

```
Computer Code #1

.
    .
    MDOLIB_HANDLE hLib;
    MDOSCAN_HANDLE hScanner;
    MDoErrorCode errCode;
    .
    .
    hMDoLib = MDoLibraryOpen( );
    if( hMDoLib == INVALID_MDOLIB_HANDLE )
    {
        return( −1 );
    }
    .
    hScanner = MDoScanOpen( hLib );
    if( hScanner == INVALID_MDOSCAN_HANDLE )
    {
        errCode = MDoGetLastError( hLib );
        ReportError( errCode );
        MDoLibraryClose( hMDoLib );
        return( −1 );
```

```
-continued

Computer Code #1

}
    .
    .
    MDoScanClose( hScanner );
    MDoLibraryClose( hMDoLib );
    .
    .
```

Error Codes

An error code reported by MDoGetLastError 820 includes two parts: component code and error code. See Appendix A for more information. Table #6 lists exemplary error codes and corresponding component codes. MDoGetLastError 820 also returns error codes set at the abstract library layer. It should be noted that the following list is for illustrative purposes only and should not be construed as limiting in any manner.

TABLE #6

| Component Code | Error Code | Description |
| --- | --- | --- |
| MDO_ERROR_MODULE | MDOE_CFG_UNKNOWN_VARIABLE | Unknown/invalid configuration variable name. |
| ML_ERROR_MODULE | MLE_XFILE_SEEK_MODE | Invalid meta file seek mode value. |
| | MLE_XFILE_SEEK_OOB | Invalid meta file seek location. |
| | MLE_XFILE_SIZE_OOB | Invalid meta file size. |
| | MLE_PKG_INVALID_FILE | Invalid update package file. |
| | MLE_PKG_INVALID_FORMAT | Invalid update package file format. |
| | MLE_SDB_INVALID_POSITION | Invalid SDB record position. |
| | MLE_SDB_INVALID_STRUCTURE | Invalid/corrupt SDB record structure. |
| | MLE_SDB_RECORD_NOT_FOUND | Missing SDB record. Record not found. |
| | MLE_SDB_NO_INODES | No more SDB INode space. |
| | MLE_SDB_NO_BLOCKS | No more SDB block space. |
| | MLE_SDB_INVALID_OFFSET_SIZE | Invalid SDB offset. |
| | MLE_SDB_BAD_INITIALIZE_PARAMS | Invalid SDB initialization parameter(s). |
| | MLE_ME_INVALID_SUBTYPE | Invalid sub-record ID value. |
| | MLE_ME_INVALID_TYPE | Invalid sub-record ID value. |
| | MLE_ME_TYPE_NOT_FOUND | Unknown sub-record ID value. |
| | MLE_ME_VIRUS_NOT_FOUND | Missing/invalid virus code. |

TABLE #6-continued

| Component Code | Error Code | Description |
|---|---|---|
| | MLE_DBU_INVALID_COMMAND | Invalid SDB update command. |
| | MLE_ME_SMALL_VREC_ARRAY | Bad virus-record array size. |
| | MLE_ME_TOO_MANY_WVSELECT_BUCKETS | Failed to add new SDB record. |
| | MLE_ME_BACKPTR_OVERFLOW | Failed to update SDB record. |

Scanning Subsystem API

Figure 11:
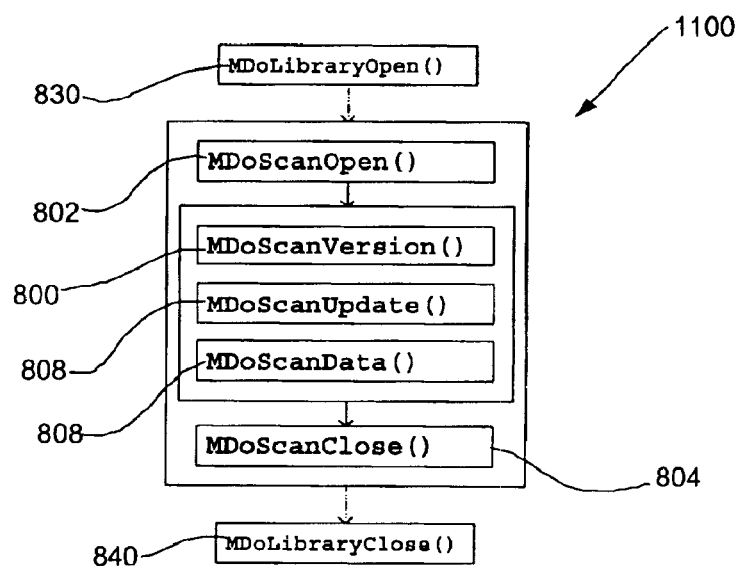
FIG. 11 illustrates a scanning subsystem API call sequence, in accordance with one embodiment.

The application program interface 800 includes a plurality of scanning subsystem components. The scanning subsystem API components provide data/content scanning and signature update service. Included are MDoScanOpen( ) 802, MDoScanClose( ) 804, MDoScanVersion( ) 806, MDoScanUpdate( ) 810, and MDoScanData( ) 808. MDoScanOpen( ) 802 is used for scanning subsystem object instantiation. MDoScanVersion( ) 806 provides scanning subsystem and signature database version information. MDoScanUpdate( ) 810 performs the signature database update. MDoScanData( ) 808 performs malicious code/content data scanning. FIG. 11 illustrates a scanning subsystem API call sequence 1100, in accordance with one embodiment.

MDoScanOpen

Table #7 illustrates exemplary information regarding MDoScanOpen( ) 802.

TABLE #7

Description
Returns a scanning subsystem instance handle.
Prototype
MDOSCAN_HANDLE MDoScanOpen( MDOLIB_HANDLE hLib );
Parameters
hLib
[in] library handle obtained using the
MDoLibraryOpen( ) function.
Return Value
Scanning subsystem instance handle if successful.
INVALID_MDOSCAN_HANDLE is returned if error.
See Also
MDoScanClose( ), MDoScanData( ), MDoScanUpdate( ),
MDoLibraryOpen( )

MDoScanClose

Table #8 illustrates exemplary information regarding MDoScanClose( ) 804.

TABLE #8

Description
Releases scanning subsystem instance and associated
system resource.
Prototype
void MDoScanClose( MDOSCAN_HANDLE hScan );
Parameters
hScan
[in] Scanning subsystem handle obtained using the
MDoScanOpen( ) function.
Return Value
none
See Also
MDoScanOpen( ), MDoScanData( ), MDoScanUpdate( )

MDoScanVersion

Table #9 illustrates exemplary information regarding MDoScanVersion( ) 806.

TABLE #9

Description
Obtain the scanning subsystem and signature version
information from a scanner handle returned by the
MDoScanOpen( ) function.
Prototype
int MDoScanVersion( MDOSCAN_HANDLE hScan,
            SVerInfo*       pVersion );
Parameters
hScan
[in] Scanning subsystem handle obtained using the
MDoScanOpen( ) function.
pVersion
[out] Pointer to a structure contain version
information.
Return Value
0 if successful, −1 otherwise.
See Also
MDoScanOpen( ), MDoScanClose( ), MDoScanData( ),
MDoScanUpdate( )

Exemplary Computer Code #2 illustrates a sample version information structure.

Computer Code #2

```
/* version information consists of
    <device id> + <MDo> + <PD> + <SDB>
    For example:
        device id:  "Win32TestPlatformRev05"
        MDo:       1
        mdo.pd:    2
        mdo.sdb:   32
*/
#define MDO_DEVID_MAX 32
typedef struct
{
    char szDevID[MDO_DEVID_MAX];   /* device id
*/
    unsigned int uMDoVer;          /* version
*/
    unsigned int uEngVer;          /* detection logic
(mdo.pd) version */
    unsigned int uSDbVer;          /* signature database
(mdo.sdb) version */
} SVerInfo;
```

The mobile communication device identification string reported by MDoScanVersion( ) 806 is set using the device identification string returned by AlDevGetInfo. (See Appendix A).

MDoScanData

Table #10 illustrates exemplary information regarding MDoScanData( ) 808.

TABLE #10

Description
MDoScanData is to be called from an application program to scan a specific data type. The calling application program specifies the scanner action, the scan target data type, a set I/O functions to access the data, and an optional callback function. The result of the data scanning is returned in a caller provided data structure. MDoScanData is re-entrant.
Prototype
int MDoScanData( MDOSCAN_HANDLE hScan,
SScanParam* pParam,
SScanResult* pResult );
Parameters
hScan
[in] Scanning subsystem handle obtained from a call to the MDoScanOpen( ) function.
pParam
[in] Pointer to a structure containing data scan parameters.
pResult
[out] Pointer to a structure containing data scan results.
Return Value
0 if successful, −1 otherwise and error code is set.
See Also
MDoScanOpen( ), MDoScanClose( ), MDoScanVersion( ), MDoScanUpdate( )

MDoScanUpdate

Table #11 illustrates exemplary information regarding MDoScanUpdate( ) 810.

TABLE #11

Description
Performs malicious code/content signature pattern database (mdo.sdb) and detection logic (mdo.pd) update.
Prototype
int MDoScanUpdate( MDOSCAN_HANDLE hScan,
SUpdateParam* pParam );
Parameters
hScan
[in] scan handle obtained using the MDoScanOpen( ) function.
pParam
[in] Pointer to an update parameter structure containing a callback function pointer for update cancellation/abort and progress status update.

Exemplary Computer Code #3 illustrates the manner in which the update parameter structure is defined.

Computer Code #3

```
typedef struct SStatus_struct
{
  int  iCurrent;
  int  iTotal;
} SStatus;
typedef struct SUpdateParam_struct
{
  void* pPrivate;
  int (*pfCallBack) (void *pPrivate, int iReason, void *pParam);
} SUpdateParam;
```

The calling application program may set the function pointer and the data to be passed to the function when calling the function. Note Table #12.

TABLE #12

| Callback Reason (iReason) | Description |
|---|---|
| MDO_UCB_STATUS | Callback is made to report update status. pParam points to the SStatus structure. SStatus.iCurrent contains amount of data received and iTotal reports the total update data size in bytes. |
| MDO_UCB_CANCEL | Callback is made to see if update cancellation is set. pParam points NULL. |

Configuration API

The application program interface 800 includes a plurality of configuration components. Included is a set of functions used to retrieve and specify the scanning subsystem settings. One goal of these functions is to provide application programs and the scanning subsystem with centralized runtime configuration access. The configuration data is stored in non-volatile persistent data storage (i.e. flash memory, etc.).

Figure 12:
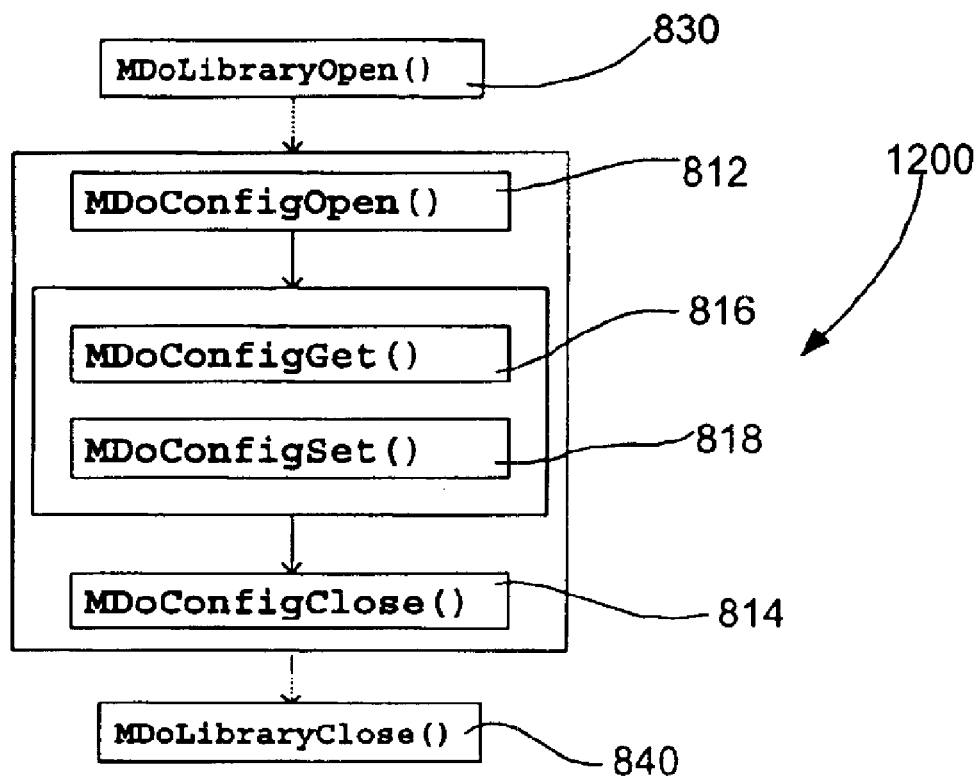
FIG. 12 illustrates one exemplary configuration API call sequence, in accordance with one embodiment.

FIG. 12 illustrates one exemplary configuration API call sequence 1200, in accordance with one embodiment. As shown, MDoConfigOpen( ) 830 returns a handle to be passed to the configuration retrieval and specification functions. MDoConfigClose( ) 814 is used to release and close the configuration handle returned by MDoConfigOpen( ) 812. MDoConfigSet( ) 818 sets a specified configuration variable with a specified value, and MDoConfigGet( ) 816 returns a configuration value for a specified variable. Configuration variable(s) settings modified by MDoConfSet( ) 818 is not necessarily saved to the permanent storage until MDoConfigClose( ) 814 is called.

Application programs may call configuration open, get or set, and immediately follow with the close function when accessing and/or specifying a variable value.

The configuration variables and values specified/retrieved using the configuration components of the application program interface 800 may be represented in null-character ('\0') terminated, 8-bit character strings. Table #13 lists available configuration variables.

TABLE #13

| Configuration Variable | Value/Example | Description |
|---|---|---|
| "ScanEnable" | "0" | disable scanning |
|  | "1" | enable scanning |
| "UpdateURL" | "http://update.mcafeeacsa.com/504i" | Base-URL for signature for update (see section 0) |

MDoConfigOpen

Table #14 illustrates exemplary information regarding MDoConfigOpen( ) 812.

TABLE #14

Description
Returns a handle to a configuration setting to be
passed to subsequent calls to MDoConfigGet( ) and
MDoConfigSet( ).
Prototype
MDOCONFIG_HANDLE MDoConfigOpen( MDOLIB_HANDLE hLib
);
Parameters
hLib
[in] library handle obtained using the
MDoLibraryOpen ( ) function.
Return Value
Configuration handle if successful.
INVALID_MDOCONFIG_HANDLE is returned if error.
See Also
MDoConfigClose( ), MDoConfigSet( ), MDoConfigGet( )

MDoConfigClose

Table #15 illustrates exemplary information regarding MDoConfigClose( ) 814.

TABLE #15

Description
Releases system resource and closes configuration
handle.
Prototype
void MDoConfigClose( MDOCONFIG_HANDLE hConfig );
Parameters
hConfig
[in] Configuration handle returned by the
MDoConfigOpen( ) function.
Return Value
none
See Also
MDoConfigOpen( ), MDoConfigSet( ), MDoConfigGet( )

MDoConfigGet

Table #16 illustrates exemplary information regarding MDoConfigGet( ) 816.

TABLE #16

Description
Obtain a configuration value for the specified
configuration variable.
Prototype
int MDoConfigGet ( MDOCONFIG_HANDLE    hConfig
                   char const*         pszName,
                   char*               pBuffer,
                   unsigned int        uSize ) ;
Parameters
hConfig
[in] Configuration handle returned by the
MDoConfigOpen( ) function.
pszName
[in] NULL-terminated configuration variable name.
pBuffer
[out] NULL-terminated configuration setting/value
for the variable specified
uSize
[in] Length of pBuffer in bytes.
Return Value
0 if successful, −1 otherwise.
See Also
MDoConfigOpen( ), MDoConfigClose( ), MDoConfigSet( )

MDoConfigSet

Table #17 illustrates exemplary information regarding MDoConfigSet( ) 818.

TABLE #17

Description
Set a value for the specified configuration
variable.
Prototype
int MDoConfigGet ( MDOCONFIG_HANDLE    hConfig
                   char const*         pszName,
                   char const*         pszValue ) ;
Parameters
hConfig
[in] Configuration handle returned by the
MDoConfigOpen( ) function.
pszName
[in] NULL-terminated configuration variable name.
pszValue
[int] NULL-terminated new configuration
setting/value for the variable specified
Return Value
0 if successful, −1 otherwise.
See Also
MDoConfigOpen( ), MDoConfigClose( ), MDoConfigGet( )

Application Program/Scanning Subsystem Communication to Facilitate Scanning

As mentioned earlier, the application programs may communicate information to the scanning subsystem to facilitate the scanning by the scanning subsystem. This communication may be facilitated via the API described above. The foregoing information may relate to the type of data to be scanned, and the timing associated with such scanning. More description regarding the manner in which the above API accomplishes such will now be set forth.

Scan Parameters (SScanParam)

The calling application program may supply the scanning subsystem with a scanning parameter using the SScanParam structure. The information contained in the scan parameter provides the scanning subsystem with: 1) scanning subsystem action type (i.e. iAction), 2) the scan data type (i.e. the type of the application data to be scanned—iDataType), 3) data pointer to the scan target (i.e. pPrivate), 4) function to retrieve the data size in bytes (i.e. pfGetSize), 5) function to resize the scan data (i.e. pfSetSize), 6) function used by the scanning subsystem to retrieve a block of scan data (i.e. pfRead), 6) function used to write to the scan data (i.e. pfWrite), and 7) call-back function for scanning subsystem status/progress reporting (i.e. pfCallBack).

Exemplary Computer Code #4 illustrates a data scan parameter structure.

COMPUTER CODE #4

```
typedef struct SScanParam_struct
{
    int      iAction;
    int      iDataType;
    void*    pPrivate;
    unsigned int  (* pfGetSize) ( void* pPrivate );
    int           (* pfSetSize) ( void* pPrivate,
                                  unsigned int uSize );
    unsigned int  (* pfRead) (  void* pPrivate,
                                unsigned int uOffset,
                                void* pBuffer,
                                unsigned int uCount );
    unsigned int  (* pfWrite) ( void* pPrivate,
                                unsigned int uOffset,
                                void const* pBuffer,
                                unsigned int uCount );
```

-continued

```
COMPUTER CODE #4
    int        (* pfCallBack) (  void* pPrivate,
                                 int iReason,
                                 SCBArg const*
                                 pCBArg );
} SSCanParam;
```

Scan Action (iAction

The scan action specifies the type of scanning to be performed on supplied application data. Table #18 illustrates various exemplary scan actions.

TABLE #18

| Scan Action ID | Description |
| --- | --- |
| MDO_SA_SCAN_ONLY | The scanning subsystem performs scanning and reports malicious code found. No repairing will be performed. |
| MDO_SA_SCAN_REPAIR | After performing scanning, object containing malicious code will be repaired. |

Scan Data Type (iDataType)

The calling application program may inform the scanning subsystem of the application data type and format using this variable.

FIG. 13 illustrates various exemplary application data types 1300 which the application programs are capable of communicating to the scanning subsystem via the API. The unstring format may conform to the Uniform Resource Locators (RFC 1738) specification. The email-string format may conform with the Internet E-mail address format (RFC 822) specification. The default domain may be set to any desired domain. Still yet, the phone-number string may include the numeric characters '0' through '9', and the '#' and '*' characters.

Scan Data Pointer/Handle (pPrivate)

A pointer (or handle) to an application scan object is further provided. The scanning subsystem does not necessarily perform direct memory I/O using this data pointer/handle. The data pointer/handle is passed back to the caller to perform read/write using the caller specified I/O functions.

Scan Data Size (pfGetSize)

The present function is used by the scanning subsystem to obtain the scan target data size (in bytes) from the calling application program.

Scan Data Resize (pfSetSize)

This function is used by the scanning subsystem to request the calling application program to resize the application data being repaired/cleaned to a given size (in bytes). This function may be used in conjunction with the scan-and-repair/delete option.

Scan Data Read Function (pfRead)

The instant function may be used by the scanning subsystem to read a specified amount of application data from the calling application program.

Scan Data Write Function (pfWrite)

This is an optional parameter which may be used by the scanning subsystem to write a specified amount of application data to the scan object as a part of the repair process. This function pointer may be set if the scan-action is set for repair or deletion.

Callback Function (pfCallBack)

If specified, the scanning subsystem calls the specified function with the information described in below table. The callback function, if returned with a negative return value, aborts the scanning process. Table #19 sets forth an exemplary callback code list.

TABLE #19

| Callback Reason ID | Description |
| --- | --- |
| MDO_CB_DETECTED | Informs the calling application program a malicious code has been detected in the scan target. The callback data argument 'arg' is set to pointer to a SCBArg structure. |
| MDO_CB_CLEAN_READY | Informs the calling application program identified malware is ready to be cleaned/repaired. The callback data argument 'arg' is set to pointer to a SCBArg structure. |

Exemplary Computer Code #5 illustrates a scanning subsystem callback structure.

```
Computer Code #5 typedef struct SCBArg_struct
{
    text_t const* pszName;      /* detected malware name */
    text_t const* pszVariant;   /* detected malware's variant name */
    unsigned int uType;         /* malware type */
} SCBArg;
```

Scan Result (SScanResult)

The result of object scanning, detected malware information, is returned to the calling application program in the SScanResult structure provided by the calling application program. The SScanResult structure contains a pointer to a structure that contains scan result information, and a pointer to a function used to remove the scan result resource. The memory used to hold the scan result is allocated by the scanning subsystem and freed by calling the function pointed by the pfDeleteResult pointer.

Exemplary Computer Code #6 illustrates a sample calling sequence.

```
Computer Code #6 int ScanAppData( ... )
{
    SScanResult scanResult;
    .
    .
    if(MDoScanData( hScanner, &scanParam,
    &scanResult ) == 0)
    {
        .
        .
        scanResult.pfFreeResult( &scanResult );
    }
    .
    .
}
```

Exemplary Computer Code #7 illustrates a detected malicious code/content information structure.

---
Computer Code #7
---
```
typedef struct SDetected_struct
{
    struct SDetected_struct* pNext;     /* pointer to next
malware found */
                                        /* NULL if at the end
of list      */
    text_t const* pszName;     /* detected malware
name */
    text_t const* pszVariant;  /* detected malware's
variant name */
    unsigned int uType;        /* detected malware
type */
    unsigned int uBehavior;    /* bit-field
specifiying severity */
                                        /* class and behavior
level     */
} SDetected;
```
---

Exemplary Computer Code #8 illustrates a scan result structure.

---
Computer Code #8
---
```
typedef struct SScanResult_struct
{
    int           iNumDectected;  /* number of malware
found */
    SDetected*    pList;          /* detected malware
list   */
    /* function ptr used to free reported scan result
*/
    void (* pfFreeResult) ( struct SScanResult_struct*
pResult );
} SScanResult;
```
---

Severity Class and Behavior Level (uBehavior)

FIG. 14 shows a bit-field variable 1400 containing malware severity flags and application program behavior levels included in the SDetect structure, in accordance with one exemplary embodiment.

Table #20 sets forth an exemplary malware severity class list.

TABLE #20

| Severity Flag | Description |
|---|---|
| MDO_SC_USER | Detected malware is harmful to the user. |
| MDO_SC_TERMINAL | Detected malware is harmful to the device. |

The scanning subsystem sets the MDO_SC_USER flag, if the scanned application data contains malware harmful to the user of the mobile communication device. MDO_SC_TERMINAL flag is set if it is harmful to the mobile communication device itself. Both MDO_SC_USER and MDO_SC_TERMINAL flags are set if it is harmful to both the user and the mobile communication device.

The application program behavior level specifies what to do with the application data containing the detected malware. Table #21 lists the behavior level values and corresponding actions by the application program.

TABLE #21

| Behavior Level | Description |
|---|---|
| MDO_BC_LEVEL0 | Process with a warning. This severity level may be assigned to data previously considered malicious. |
| MDO_BC_LEVEL1 | Prompt the user before processing. Ask the user if he/she wants the application to process the data. |
| MDO_BC_LEVEL2 | Do not process the data. |
| MDO_BC_LEVEL3 | Do not process the data and prompt user for removal. If the content is stored on the device, prompt the user for permission before removal. |
| MDO_BC_LEVEL4 | Do not process the data and automatically remove if stored. |

When multiple malicious codes are found in a scanned application data, the calling application program is expected to act with the highest behavior level. For example, if both MDO_BC_LEVEL0 and MDO_BC_LEVEL3 are reported, the application program may take on MDO_BC_LEVEL3 actions.

FIG. 15 illustrates a chart 1500 setting forth the manner in which the timing of scanning by the scanning subsystem varies as a function of the data types identified via the variables of FIG. 13.

Signature Database Update

As mentioned earlier, the update process may be streamlined to accommodate the limited bandwidth inherent in mobile communication frameworks. More information regarding the various ways that this may be accomplished will now be set forth.

Updated Components

The MDoScanUpdate function provides two components [i.e. malicious code detection logic (mdo.pd) and signature database (mdo.sdb)] with update service. One component (i.e. mdo.pd) may contain the detection logic and be updated fully when a newer version is available. Another component (i.e. mdo.sdb) may be updated incrementally up to n previous versions. A full update for the second component may be performed on mobile communication devices with versions older than n. For example, if n is set to 5, and the latest version is 20, then a full update is performed on mobile communication devices with a version older than 15.

Activation via User Interface

Figure 16:
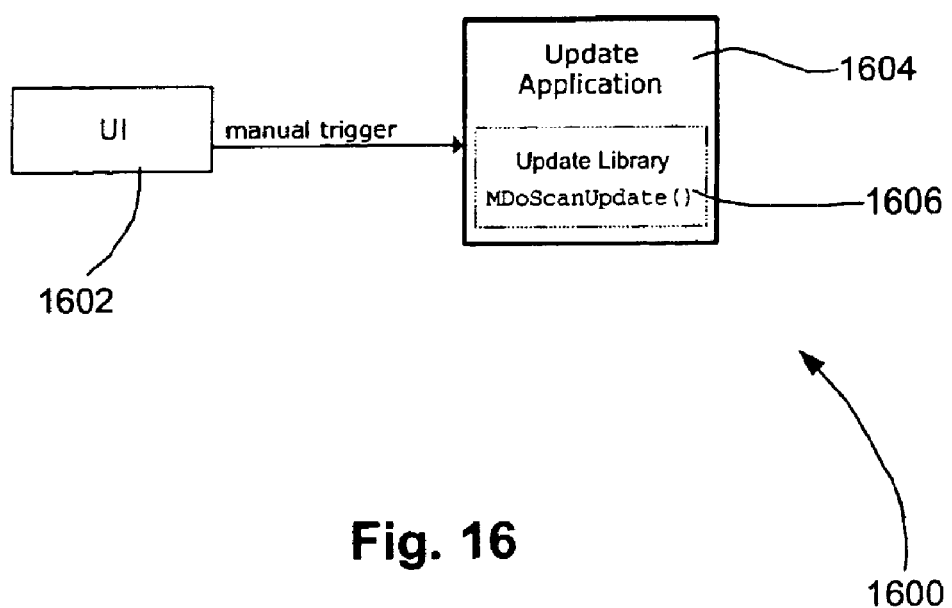
FIG. 16 illustrates an exemplary flow describing the manner in which the update is initiated by a user interface, in accordance with one embodiment.

FIG. 16 illustrates an exemplary flow 1600 describing the manner in which the update is initiated by a user interface, in accordance with one embodiment. As shown, the virus pattern update may be initiated by the mobile communication device user by selecting a menu entry via a user interface 1602. Once the user selects the update menu, an update application 1604 is activated and connects to a back end server via the appropriate update interface function 1606.

Communication Protocol

The update library may communicate with the back end server via HTTP protocol.

Update Process

Figure 17:
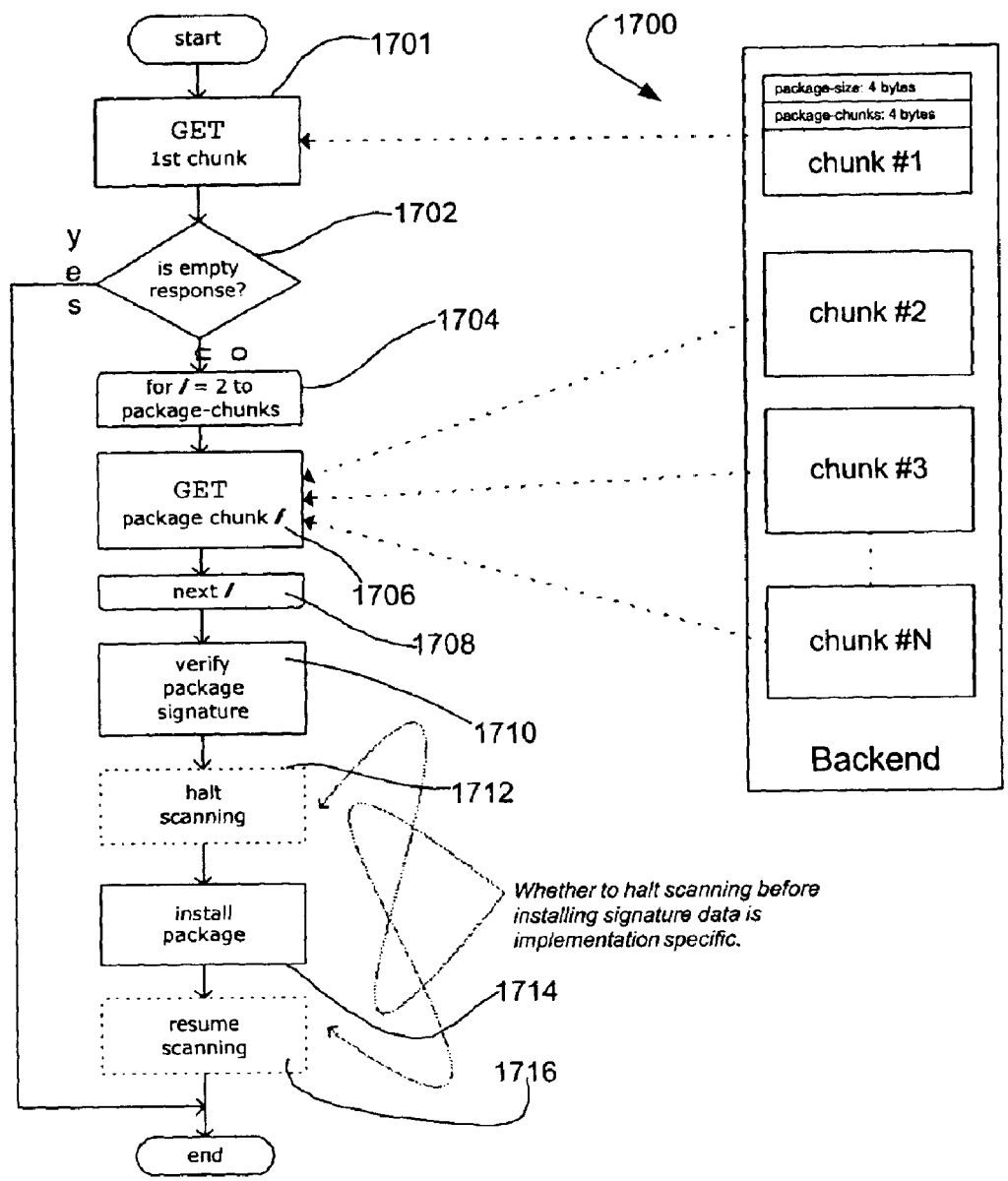
FIG. 17 illustrates a method for efficiently updating a scanning subsystem of a mobile communication device, in accordance with one embodiment.

FIG. 17 illustrates a method 1700 for efficiently updating a scanning subsystem of a mobile communication device, in accordance with one embodiment. In one embodiment, the present method 1700 may be implemented in the context of the application programs, scanning subsystem, and operating system of the architecture 300 of FIG. 3 and systems of FIGS. 1 and 2. It should be noted, however, that the present method 1700 may be implemented in any desired context.

To initiate the process, a request for an update may be sent from at least one mobile communication device to a back-end server. Of course, in other embodiments, the update may be sent without a request.

In one embodiment, the update may be requested by the mobile communication device utilizing a request data structure. Optionally, such data structure may include variables such as a uniform resource locator (URL) variable, mobile communication identifier variable, an application program interface version variable, a detection logic variable, a signature version variable, and/or a portion number variable.

Table #22 illustrates an exemplary URL that may be used for such purpose.

TABLE #22

<BASE-URL>?dev=<DEV-ID>&mdo=<MDO-VER>&eng=<ENG-VER>&sdb=<SDB-VER>&chk=<CHUNK>

Below is a table that describes the above URL variables

| Variable | Description |
|---|---|
| <BASE-URL> | update server URL obtained using the MDoConfigGet function (see section 0) |
| <DEV-ID> | Mobile communication device identifier; returned by the AIDevGetInfo function. |
| <MDO-VER> | MDo API version |
| <ENG-VER> | detection logic, mdo.pd, version |
| <SDB-VER> | signature database, mdo.sdb, version |
| <CHUNK> | update package chunk, or portion, number; one (=1) initially |

Table #23 illustrates a specific example of a URL that conforms with the above description.

TABLE #23 http://update.mcafeeacsa.com/504i?dev=X504i05&mdo=2&eng=3&sdb=56&chk=1

The above URL of Table #23 specifies base-URL "http://update.mcafeeacsa.com/504i", "X504i05" as the device identifier, API version 2, malicious code detection logic version 3, and signature database version 56. It should be noted that the "chunk," or portion, number may be set to 1 when the mobile communication device initially contacts the back end server. Also, the base-URL may be obtained using the MDoConfigGet API using the "UpdateURL" configuration variable.

After receiving the request, the back end server determines which update package needs to be downloaded by comparing stored malicious code detection logic and signature database versions with the version information encoded in the URL.

If no update is needed, the backend returns a no-content response. In operation 1701, the mobile communication device receives the response as the first portion. If it is determined that the first portion includes the foregoing no-content response (see decision 1702), the method 1700 is terminated, as there is no update to download. Such feature is beneficial in accommodating the limited bandwidth inherent in mobile communication frameworks.

On the other hand, if the first portion of an update package is returned, the method 1700 is continued by receiving additional portions of the update subsequent to (or possibly in parallel with) the receipt of the first portion of the update. Note operations 1704–1708. It should be noted that the first portion may be accompanied with the total package size and portion count information.

To download the remaining update portions, the portion number of the download URL may be modified. Table #24 illustrates a specific example of a URL that specifies portion number "3."

TABLE #24 http://update.mcafeeacsa.com/504i?dev=X504i05&mdo=2&eng=3&sdb=56&chk=3

In one embodiment, integrity of the update may be determined. Accordingly, the update may be conditionally installed with the scanning subsystem, based on whether the integrity of the update is verified.

As an option, the integrity of the update may be determined utilizing a signature. Such signature may be received with one of the portions (i.e. a last portion) of the update. Then, the signature may be compared against another signature generated utilizing each of the portions of the update. Note operation 1710.

In one embodiment, the signature may be generated using a RSA private key and authenticated on the mobile communication device using a corresponding public key included in the update. The signature verification and generation may further be performed using a specified authentication library.

Assuming that the integrity is verified, any scanning being performed by the scanning subsystem is paused, or halted. Note operation 1712. It should be noted that such pausing may be optional.

Next, the update may be installed with the scanning subsystem. Note operation 1714. In the embodiment where any scanning is paused, the scanning may subsequently be resumed utilizing the scanning subsystem upon the update being installed with the scanning subsystem. See operation 1716.

To accommodate the limited bandwidth inherent in mobile communication frameworks, a size of the portions of the update may be minimized. Moreover, the portions of the update may be compressed.

In yet another embodiment, a format of each portion of the update may be designed to accommodate the limited bandwidth inherent in mobile communication frameworks. More information will now be set forth regarding such format.

Table #25 illustrates an exemplary format for downloading the portions of the update.

TABLE #25

MPKG
<part$_1$>
<part$_2$>
.
.
.
<part$_n$>
[signature:sig-len]
[sig-len:4]

Each of the foregoing parts set forth in Table #25 is defined as follows in Table #26.

TABLE #26

X-ContentLength: <part-length>\r\n
X-ContentName: <part-name>\r\n
X-Name: <component-name>\r\n
X-Version: <component-version>\r\n
\r\n
[part-data: part-length bytes]

Each part is made up of a header and data. Such header may indicate an identifier of the associated portion of the update, a length of the associated portion of the update, etc. Moreover, the header may specify the contained data name and length, and be separated from the actual data with an extra CR+LF pair. Table #27 sets forth exemplary data/content names associated with the header.

TABLE #27

| Component Name | Description |
|---|---|
| "pd" | detection logic |
| "sdb" | signature database update |

Table #28 illustrates an exemplary update package.

TABLE #28

MPKG
X-ContentLength: 6423\r\n
X-ContentName: update30__32\r\n
X-Name: sdb\r\n
X-Version: 32\r\n
\r\n
<SDB update binary:6423>
<signature:sig-len>
<sig-len:4>

Abstract Library API

As mentioned previously, a platform-independent system and associated method are provided for use with a mobile communication device. Included is a platform-independent scanning subsystem in communication with the operating system of a mobile communication device for scanning purposes. Further provided is a platform-independent application program interface for interfacing the operating system and the scanning subsystem. The platform-independent application program interface includes an abstract library for porting the platform-independent scanning subsystem to the mobile communication device and associated operating system.

By this design, the scanning subsystem may be platform-independent, and thus be capable of being implemented on any type of operating system/mobile communication device combination.

In one embodiment, the abstract library may support system initialization, library initialization, error functions, memory allocation, input/output (I/O), data authentication, synchronization, hypertext transfer protocol, shared memory, system time, device information, and debugging. More exemplary information relating to one optional implementation of the foregoing application program interface is set forth in Appendix A.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

APPENDIX A

The present application program interface (API) includes the following subsystems:

system initialization
library initialization
error functions
heap memory allocation
persistent memory/storage I/O
data authentication
synchronization object (semaphore)
HTTP API
shared memory
system time
device information
debugging Also described in this Appendix is a set of C-language definition(s) defined in the abstraction library (AL) layer for use in the API library.

System Initialization

Platform/system dependent boot initialization is performed by the AlLibrarySysInit ( ) function. This function is designed to be called from the MDoSystemInit ( ) function described earlier.

AlLibrarySysInit

Description

Performs system dependent initialization.

Prototype int AlLibrarySysInit(void);

Parameters none

Return Value 0 if successful, −1 otherwise.

Library Initialization

The platform abstraction API library is initialized using the AlInitLibrary ( ) function. The abstraction library is to be initialized once before an abstraction API function is called. The system resource obtained and initialized by AlInitLibrary ( )is released when the AlCleanupLibrary ( ) function is called.

AlInitLibrary

Description

Performs library initialization. This function is to be called by the

MDoLibraryOpen ( ) function.

Prototype int AlInitLibrary(void);

Parameters none

Return Value 0 if successful, −1 otherwise.

AlCleanupLibrary

Description

Releases system resource acquired by the AlInitLibrary ( ) function. This function is to be called by the MDoLibraryClose ( ) function specified earlier.

Prototype void AlCleanupLibrary(void);

Parameters none

Return Value none

Error Functions

Included in the AL library is a set of error functions used to set and retrieve task/thread specific error codes. It is the responsibility of the abstraction layer implementer to set appropriate error codes and component codes.

AlGetLastError

Description

Returns the calling task/thread's last-error code value. Functions set the returned value using the AlSetLastError( ) function.

The AlErrorCode data type is internally represented using a 32-bit unsigned value.

Prototype

AlErrorCode AlGetLastError(void);

Parameters none

Return Value

The calling thread/task's last-error value set using the AlSetLastError( ) function.

AlSetLastError

Description

Sets the last-error code for the calling thread/task.

Prototype void AlSetLastError(AlErrorCode errorCode);

Parameters errorCode

[in] 32-bit error code value.

Return Value none

Error/Status Codes

| Component | | Error | | |
|---|---|---|---|---|
| Code | Value | Code | Value | Description |
| N/A | 00h | ALE_SUCCESS | 0000h | success; not an error |
| N/A | 00h | ALE_CANCELLED | 0001h | operation cancelled; not an error |
| AL_SYS_MODULE | 01h | ALE_BAD_FILE_MODE | 2711h | invalid file mode |
| | | ALE_FILE_OPEN | 2712h | failed to open |
| | | ALE_FILE_WRITE | 2713h | failed to write to a file |
| | | ALE_BAD_SEEK_MODE | 2714h | invalid seek mode |
| | | ALE_SEEK_OOB | 2715h | invalid seek location |
| | | ALE_FILE_SEEK | 2716h | failed to seek to a specific file location |
| | | ALE_FILE_READ | 2717h | failed to read |
| | | ALE_FILE_WRITE_MODE | 2718h | invalid write mode access |
| | | ALE_SIZE_OOB | 2719h | invalid file size; failed to change file size |
| | | ALE_SEM_CREATE | 271Ah | semaphore creation failed |
| | | ALE_SEM_OPEN | 271Bh | semaphore open failed |
| | | ALE_SEM_WAIT | 271Ch | wait on semaphore failed |
| AL_HTTP_MODULE (1000h-1FFFh) | 11h | ALE_HTTP_OK | 11C8h | "200 ok"; not an error |
| | | ALE_HTTP_NO_CONTENT | 11CCh | "204 no content"; not an error |
| | | ALE_HTTP_FORBIDDEN | 1193h | "403 forbidden"; forbidden URL |
| | | ALE_HTTP_NOT_FOUND | 1194h | "404 not found"; invalid URL |
| | | ALE_HTTP_REQ_TIMEOUT | 1198h | "408 request timeout"; GET/PUT request time out |
| | | ALE_HTTP_GW_TIMEOUT | 11F8h | "504 gateway timeout"; failed to receive info from gateway |
| AL_COM_MODULE (2000h-20FFh) | 20h | ALE_COM_TEMP_ERROR | 2000h | temporary communication error |
| | | ALE_COM_PERM_ERROR | 2001h | permanent communication error |
| AL_DA_MODULE (2100h-20FFh) | 21h | ALE_DA_CERT_EXPIRED | 2100h | expired certificate |
| | | ALE_DA_CERT_BAD | 2101h | invalid certificate |
| | | ALE_DA_CERT_UNSUPPORTED | 2102h | unsupported certificate |
| | | ALE_DA_CERT_REVOKE | 2103h | revoked certificate |
| | | ALE_DA_CERT_EXPIRED | 2104h | certificate expired |
| | | ALE_DA_SCA_CERT_EXPIRED | 2105h | sub CA certificate expired |
| | | ALE_DA_RCA_CERT_EXPIRED | 2106h | root CA certificate expired |
| | | ALE_DA_RCA_CERT_DISABLED | 2107h | root CA certificate disabled |
| | | ALE_DA_CERT_UNKNOWN | 2108h | unknown certificate |
| | | ALE_DA_DATA_ALTERED | 2109h | data altered |

The above table lists a set of AL component and error codes. An error reported using the AlSetLastError function is a 32-bit value formed by combining a component code with an error code. The error set at the AL level is retrieved using the MDoGetLastError function to take an appropriate action when an error occurs.

Heap Memory Allocation

The abstraction layer provides a heap memory allocation API for a calling application program (i.e. a "caller") to dynamically allocate memory needed. The allocated memory is assumed to be globally sharable which can be accessed by multiple applications/tasks. The AlMemAlloc ( ) and AlMemFree ( ) API functions provide allocation and deallocation of the heap memory.

| Function | Description |
| --- | --- |
| void* AlMemAlloc(<br>　　unsigned int uSize) | allocate a block of dynamic memory |
| void AlMemFree(<br>　　void* ptr) | free memory allocated using AlMemAlloc |

AlMemAlloc

Description

Allocate a specified amount of dynamic memory and returns a pointer to that memory. The allocated memory block is directly accessible by the caller (i.e. calling application program) without requiring a special operation (i.e. memory locking).

Prototype void* AlMemAlloc(unsigned int uSize)

Parameters uSize

[in] Amount of memory to allocate in bytes.

Return Value

A pointer to the allocated memory. NULL if the request fails or the request size is zero.

See Also

AlMemFree ( )

AlMemFree

Description

Frees a dynamic memory block returned by the AlMemAllco ( ) function.

Prototype void AlMemFree(void* pData)

Parameters pData

[in] Pointer to a memory block to be freed.

Return Value none

See Also

AlMemAlloc ( )

Persistent Storage I/O

The persistent storage (i.e. flash memory) access is performed using a file I/O API. See below:

| Name | Description |
| --- | --- |
| AL_FILE_HANDLE AlFileOpen(<br>　　char const* pszFilename,<br>　　int iMode) | open, create if necessary, specified file and return its handle |
| void AlFileClose(<br>　　AL_FILE_HANDLE hFile) | close file handle returned by AlFileOpen( ) |
| unsigned int AlFileSeek(<br>　　AL_FILE_HANDLE hFile) | reposition file offset |
| unsigned int AlFileRead(<br>　　AL_FILE_HANDLE hFile,<br>　　void* pBuffer,<br>　　unsigned int uSize) | read from a file handle |
| unsigned int AlFileWrite(<br>　　AL_FILE_HANDLE hFile,<br>　　void const * pBuffer,<br>　　unsigned int uSize) | write to a file handle |
| int AlFileSetSize(<br>　　AL_FILE_HANDLE hFile,<br>　　unsigned int uSize) | resize file |
| int AlFileStat(<br>　　char const* pszFilename,<br>　　ALStatBuf* pStat) | obtain file information |

The file handle type AL_FILE_HANDLE is defined as

```
typedef struct AL_FILE_HANDLE_struct
{
} *AL_FILE_HANDLE;
```

And a constant used to specify an invalid persistent storage handle INVALID_AL_FILE_HANDLE is defined as define INVALID_AL_FILE_HANDLE ((AL_FILE_HANDLE) 0)

The file status buffer type AlStatBuf is defined as

```
typedef struct AlStatBuf_struct
{
    unsigned long ulSize;
    unsigned long ulTime;
} AlStatBuf;
```

AlFileOpen
 Description
 Opens specified file and returns its handle.
 Prototype
 AL_FILE_HANDLE AlFileOpen( const char* pszFilename,
    int iMode);
 Parameters
 pszFilename
 [in] File name/path string.
 iMode
 [in] File access mode.
    AL_OPEN_READ Open file for reading
    AL_OPEN_WRITE Open file for both reading and writing
 Return Value
 File handle if successful, INVALID_AL_FILE_HANDLE otherwise.
 See Also
 AlFileClose ( ), AlFileRead ( ), AlFileWrite ( )
AlFileClose
 Description
 Closes and releases system resource associated with specified file handle.
 Prototype
 void AlFileClose(AL_FILE_HANDLE hFile);
 Parameter
 hFile
 [in] File handle returned by AlFileOpen ( ).
 Return Value
 none
 See Also
 AlFileOpen ( ), AlFileRead ( ), AlFileWrite ( )
AlFileSeek
 Description
 Repositions read/write file offset.
 Prototype
 long AlFileSeek(AL_FILE_HANDLE hFile,
    long lOffset,
    int iWhence);
 Parameter
 hFile
 [in] An open file handle.
 lOffset
 [in] File offset relative to the iWhence directive.
 iWhence
 [in] Initial position. Possible values are:
    AL_SEEK_SET The offset parameter specifies the absolute file offset. In other words, offset from the beginning of the file.
    AL_SEEK_CUR Specifies relative offset-the offset parameter specifies file offset from the current file offset.
    AL_SEEK_END Specifies file offset from the end of the file.
 Return Value
 Resulting file offset if successful, −1 L otherwise.
 See Also
 AlFileOpen ( ), AlFileClose ( ), AlFileRead ( ), AlFileWrite ( )
AlFileRead
 Description
 Reads a block of data from a file.
 Prototype
 unsigned int AlFileRead(AL_FILE_HANDLE hFile,
    void* pBuffer,
    unsigned int uSize);
 Parameter
 hFile
 [in] An open file handle.
 pBuffer
 [out] Data buffer.
 uSize
 [out] Amount of data to read.
 Return Value
 Number of bytes read if success, −1 otherwise.
 See Also
 AlFileOpen ( ), AlFileClose ( ), AlFileSeek ( ), AlFileWrite ( )
AlFileWrite
 Description
 Writes a block of data to a file.
 Prototype
 unsigned int AlFileWrite( AL_FILE_HANDLE hFile,
    void const* pBuffer,
    unsigned int uSize);
 Parameter
 hFile
 [in] An open file handle.
 pBuffer
 [int] Buffer holding data to write.
 uSize
 [out] Amount of data to write.
 Return Value
 Amount of data written if success, −1 otherwise.
 See Also
 AlFileOpen ( ), AlFileClose ( ), AlFileSeek ( ), AlFileRead ( )
AlFileSetSize
 Description
 Resizes open file.
    For platforms without native file resize support, the abstraction library implements this functionality by modifying the size information stored at the beginning of each file when the AlFileClose ( ) function is called.
 Prototype
 unsigned int AlFileSetSize( AL_FILE_HANDLE hFile,
    unsigned int uSize);
 Parameter
 hFile
 [in] Handle referencing an open file with write-mode.
 uSize

[out] New file length in bytes.
Return Value
0 if success, −1 otherwise.
See Also
AlFileStat ( )
AlFileStat
Description
Retrieve file size and creation timestamp.
For platforms that have do not provide a native file size and/or timestamp information retrieval method, the abstraction library implements this function by storing the information at the beginning of each file.
Prototype
int AlFileStat( char const* pszFilename,
AlStatBuf* pStat);
Parameter
pszFilename
[in] Name of file to retrieve information.
pStat
[out] Pointer to a structure used to return size and timestamp information. The structure contains the following fields:

```
typedef struct AlStatBuf_struct
{
    unsigned long ulSize;   /* size in bytes */
    unsigned long ulTime;   /* creation time */
} AlStatBuf;
```

Return Value
0 if success, −1 otherwise.
Data Authentication
Included in the platform abstraction API is a set of functions for authenticating data.
The data authentication API is used to validate downloaded malware signature database.
Once the caller obtains an authentication object handle using the AlDaOpen function, a call to the AlDaVerify is made to verify the data supplied.
AlDaGetSignerInfo ( ) is used to retrieve a signer information. AlDaClose ( ) is used to close and release data authentication handle and related system resources.
Below is an exemplary data authentication API The data authentication handle returned by the AlDaOpen ( ) function is defined as

```
ALHANDLE(AL_DA_HANDLE);
#define INVALID_AL_DA_HANDLE ((AL_DA_HANDLE) 0)
```

The signer information structure is defined as

```
#define MAX_DA_SIGNER_NAME 128
typedef struct DaSignerInfo_struct
{
    char szSignerName[MAX_DA_SIGNER_NAME];
} DaSignerInfo;
```

AlDaOpen
Description
Creates and returns a data authentication handle.
Prototype
AL_DA_HANDLE AlDaOpen(const void* pSig,
unsigned int uSigSize);
Parameters
pSig
[in] Pointer to a signature data.
uSigSize
[in] Signature size in bytes.
Return Value
Data authentication handle if successful, INVALID_AL_DA_HANDLE otherwise.
See Also
AlDaClose ( ), AlDaUpdate ( ), AlDaVerify ( ),
AlDaGetSignerInfo ( )
AlDaClose
Description
Releases system resource used for a data authentication handle.
Prototype
void AlDaClose(AL_DA_HANDLE hDa);
Parameters
hDa
[in] Data authentication handle returned by AlDaOpen.
Return Value

| Function | Description |
| --- | --- |
| AL_DA_HANDLE AlDaOpen( const void *pSig, unsigned int uSigSize) | Obtain data authentication handle from a given signature/certificate |
| void AlDaClose( AL_DA_HANDLE hHandle) | Close data authentication handle obtained using AlDaOpen( ) |
| AlDaVerify( AL_DA_HANDLE hDA, int (*pfRead) (void *, void *, int), void *pPrivate) | Data authentication function. The caller provides a data retrieval method via callback function. |
| int AlDaGetSignerInfo( AL_DA_HANDLE hDA, DaSignerInfo *pDSI) | Retrieve signer information. | none
See Also
AlDaOpen ( ), AlDaUpdate ( ), AlDaVerify ( ),
AlDaGetSignerInfo ( )

AlDaVerify
Description
Performs data authentication.
Prototype
int AlDaVerify(AL_DA_HANDLE hDa,
    int (*pfRead)(void *, void *, int),
    int iTotalSize,
    void *pPrivate);
Parameters
hDa
[in] Data authentication handle.
pfRead
[in] Caller callback function to use for reading data (see). It returns −1 in case of an error, 0 if there is no more data to read, and otherwise the amount of data read and returned to the AlDaVerify function. It is expected that the function is called multiple times.
iTotalSize
[in] Total data size to be verified.
pPrivate
[in] Caller's private data to be passed by pfRead callback.
Return Value
0 if the application data is authenticated, −1 otherwise.
See Also
AlDaOpen ( ), AlDaClose ( ), AlDaGetSignerInfo ( )
Below is a sample data read callback function.

```
int ReadCallback(void *pPrivate, void *pData, int iSize)
{
    .
    .
    .
    return iDataRead;
}
```

AlDaGetSingerInfo
Description
Retrieves data authentication signer information.
Prototype
int AlDaGetSignerInfo( AL_DA_HANDLE hDA,
    DaSignerInfo *pDSI);
Parameters
hDa
[in] Data authentication handle.
pDSI
[out] Pointer to a structure containing the signer information.
Return Value
0 if the signer information is obtained successfully, −1 otherwise.
See Also
AlDaOpen ( ), AlDaClose ( ), AlDaVerify ( )

Synchronization Object

Resource synchronization and control is done using a semaphore. Included in the abstraction library is a set of functions to create, open, close and modify a semaphore object. Below is an exemplary semaphore API.

| Function | Description |
| --- | --- |
| AL_SEM_HANDLE AlSemCreate( char const* pszName) | create a named semaphore and return its handle |
| AL_SEM_HANDLE AlSemOpen( char const* pszName) | return a handle to an existing semaphore |
| void AlSemClose( AL_SEM_HANDLE hHandle) | close semaphore handle; reference count is decremented by one, and the semaphore referenced is released if the count reaches zero. |
| int AlSemGet( AL_SEM_HANDLE hHandle) | acquire a semaphore |
| int AlSemRelease( AL_SEM_HANDLE hHandle) | release a semaphore |

AlSemCreate
Description
Creates a named-semaphore, sets internal counter to zero, and returns its handle.
Prototype
AL_SEM_HANDLE AlSemCreate( char const* pszName);
Parameters
pszName
[in] Semaphore name string.
Return Value
Semaphore handle if successful, INVALID_AL_SEM_HANDLE otherwise.
See Also
AlSemOpen ( ), AlSemClose ( ), AlSemGet ( ), AlSemRelease ( )

AlSemOpen
Description
Returns a handle to an existing semaphore.
Prototype
AL_SEM_HANDLE AlSemOpen(char const* pszName);
Parameters
pszName
[in] Semaphore name.
Return Value
Semaphore handle if successful, INVALID_AL_SEM_HANDLE otherwise.
See Also
AlSemCreate ( ), AlSemClose ( ), AlSemGet ( ), AlSemRelease ( )

AlSemClose

Description

Closes and releases system resource associated specified semaphore handle.

Semaphore usage/reference count is also decremented, and the referenced semaphore object is destroyed if the count reaches zero.

Prototype void AlSemClose( AL_SEM_HANDLE hSem);

Parameters hSem

[in] Semaphore handle obtained using AlSemCreate ( ) or AlSemopen ( ).

Return Value none

See Also

AlSemCreate ( ), AlSemOpen ( ), AlSemGet ( ), AlSemRelease ( )

AlSemGet

Description

Acquires specified semaphore. If the internal counter is greater than zero on entry, it is decremented by one and returned immediately. If the internal counter is zero on entry, the call is blocked until other tasks/threads call AlSemRelease ( ) to make it greater than zero.

Prototype int AlSemGet(AL-SEM_HANDLE hSem);

Parameters hSem

[in] Semaphore handle.

Return Value 0 if successful, −1 otherwise.

See Also

AlSemCreate ( ), AlSemOpen ( ), AlSemClose ( ), AlSemRelease ( )

AlSemRelease

Description

Releases the semaphore, incrementing the internal counter by one.

Prototype int AlSemRelease(AL_SEM_HANDLE hSem);

Parameters hSem

[in] Semaphore handle.

Return Value 0 if successful, −1 otherwise.

See Also

AlSemCreate ( ), AlSemOpen ( ), AlSemClose ( ), AlSemGet ( )

HTTP API

Included in the abstraction library is a set of functions that provide HTTP network I/O using a caller provided callback structure. Below is an exemplary HTTP API.

| Function | Description |
| --- | --- |
| AL_HTTP_HANDLE AlHttpOpen(void) | Create and return an HTTP I/O handle. |
| void AlHttpClose( AL_HTTP_HANDLE hHandle) | Close HTTP I/O handle. |
| int AlHttpExec( AL_HTTP_HANDLE hHandle, char const* pszMethod, char const* pszURL, AlHttpCallbacks* pHttpCb, void* pPrivate) | Perform GET or PUT operation. |

The HTTP handle returned by the AlHttpOpen() function is defined as

```
typedef struct AL_HTTP_HANDLE_struct
{
} *AL_HTTP_HANDLE;
#define INVALID_AL_HTTP_HANDLE ((AL_HTTP_HANDLE)0)
```

The HTTP callback structure AlHttpcallbacks is defined as

```
typedef struct AlHttpCallbacks_struct
{
    unsigned int (* pWrite)   (void*           pPrivate,
                               void const*     pData,
                               unsigned int    uSize);
    unsigned int (* pRead)    (void*           pPrivate.
                               void*           pData,
                               unsigned int    uSize);
    unsigned int (* pGetSize)(void* pPrivate);
    unsigned int (* pSetSize)(void*           pPrivate,
                              unsigned int    uSize);
} AlHttpCallbacks;
```

The callback functions given in the above HTTP callback structure provide the following functionalities:

pWrite Called by the system HTTP library to store incoming HTTP request data.

pRead Used to retrieve application data to be sent as part of an HTTP request.

pGetSize Provides the HTTP library with application's content data size, "Content-Length".

pSetSize Called by the HTTP library to inform calling application with incoming content data length when available.

AlHttpOpen

Description

Creates and returns a handle to the HTTP library.

Prototype

AL_HTTP_HANDLE AlHttpOpen(void);

Parameters none

Return Value

INVALID AL HTTP_HANDLE is returned if failed to create an HTTP instance.

See Also

AlHttpClose ( )

AlHttpClose

Description

Closes and release system resources associated with an HTTP handle.

Prototype void AlHttpClose( AL_HTTP_HANDLE hHTTP);
Parameters
hHTTP
[in] HTTP library handle returned by the AlHttpOpen ( ) function.
Return Value
none
See Also
AlHttpClose ( )
AlHttpExec
Description
Executes an HTTP method ("GET" or "POST") on the specified URL with optional header information.
Prototype
int AlHttpExec( AL_HTTP_HANDLE hHTTP,
   char const* pszMethod,
   char const* pszURL,
   AlHttpCallbacks* pHttpCb,
   void* pPrivate);
Parameters
hHTTP
[in] HTTP library handle returned by the AlHttpOpen ( ) function.
pszMethod
[in] HTTP method specification. HTTP "GET"or "POST".
pszURL
[in] The URL where the HTTP request is made.
pHttpCb
[in] Pointer to a set of caller specified HTTP I/O functions. The HTTP library uses the functions specified in the AlHttpCallbacks structure for data I/O.
pPrivate
[in/out] Pointer to a caller data to be passed back to the callback functions specified in the AlHttpCallbacks structure.
Return Value
0 if successful, −1 otherwise.
See Also
AlHttpOpen ( ), AlHttpClose ( )
Shared Memory
   The location of the system memory where the library's shared objects are stored is obtained using the AlShmAddress ( ) function. This shared information area is allocated/prepared at device boot time and referenced by different instances of the library.
AlShmAddress
Description
Returns shared memory address.
Prototype
void* AlShmAddress(void);
Parameters
none
Return Value
shared memory address if successful, NULL otherwise.
Time
   AlTmGetCurrent ( ) provides callers with the current system time in seconds.
AlTmGetCurrent
Description
Obtains current system time.
Prototype
unsigned long AlTmGetCurrent(void);
Parameters
none
Return Value
On success, time in seconds since the Epoch (00:00:00 in UTC, Jan. 1, 1970). On error, ( (unsigned long)−1L) is returned.
Parameters
pszOutput
[in] String to output to debug console.
Return Value
0 on success, −1 on failure.
Device Information
AlDevGetInfo
Description
Retrieves device specific information. Device identification string returned by this function is used by the API.
Prototype
int AlDevGetInfo(AlDeviceInfo* pDeviceInfo);
Parameters
pDeviceInfo
[out] Pointer to device information.
The AlDeviceInfo structure is defined as

```
#define AL_MAX_DEVICE_ID 32
typedef struct AlDeviceInfo_struct
{
    char szDeviceID[AL_MAX_DEVICE_ID];
} AlDeviceInfo;
```

The identification string, szDeviceID, is a unique terminal/device identifier—used to uniquely identify a particular mobile communication device from all others. This information is used in constructing a malware signature download URL for the mobile communication device. It must not contain any characters that are not allowed in an URL (i.e. white space).
Return Value
0 on success, −1 on failure.
Debugging
AlDbgOutput
Description
Outputs debug string to a debug console. This function is a null function for release build.
Prototype
int AlDbgOutput(char const* pszOutput);

What is claimed is:
1. A platform-independent system for use with a mobile communication device, comprising:
   a mobile communication device capable of communicating via a wireless network, and including an operating system and an application program installed thereon, the application program adapted for performing tasks utilizing the mobile communication device;
   a platform-independent scanning subsystem in communication with the operating system of the mobile communication device for scanning application data relating to the tasks performed by the application program; and a platform-independent application program interface for interfacing the operating system and the scanning subsystem, the platform-independent application program interface including an abstract library for porting the platform-independent scanning subsystem to the mobile communication device and associated operating system;

wherein the application program communicates information relating to the application data to the scanning subsystem to facilitate the scanning by the scanning subsystem.

2. The system of claim 1, wherein the application program includes a mail application program.

3. The system of claim 1, wherein the application program includes a browser application program.

4. The system of claim 1, wherein the application program includes a phone book application program.

5. The system of claim 1, wherein the application program includes a message application program.

6. The system of claim 1, wherein the application program includes a Java application program.

7. The system of claim 1, wherein the mobile communication device includes a cellular telephone.

8. The system of claim 1, wherein the abstract library supports system initialization.

9. The system of claim 1, wherein the abstract library supports library initialization.

10. The system of claim 1, wherein the abstract library supports error functions.

11. The system of claim 1, wherein the abstract library supports memory allocation.

12. The system of claim 1, wherein the abstract library supports memory input/output (I/O).

13. The system of claim 1, wherein the abstract library supports data authentication.

14. The system of claim 1, wherein the abstract library supports synchronization.

15. The system of claim 1, wherein the abstract library supports shared memory.

16. The system of claim 1, wherein the abstract library supports system time.

17. The system of claim 1, wherein the abstract library supports hypertext transfer protocol.

18. The system of claim 1, wherein the abstract library supports device information.

19. The system of claim 1, wherein the abstract library supports debugging.

20. The system of claim 1, wherein the abstract library supports system initialization, library initialization, error functions, memory allocation, input/output (I/O), data authentication, synchronization, hypertext transfer protocol, shared memory, system time, device information, and debugging.

21. The system of claim 1, wherein the abstract library facilitates the communication of the information relating to the application data that facilitates the scanning.

22. The system of claim 1, wherein the information relates to different types of the application data.

23. The system of claim 22, wherein the types include a hypertext mark-up language (HTML)-type, a uniform resource locator (URL)-type, an electronic mail-type, a telephone number-type, a Java-type, a text-type, and an unknown-type.

24. The system of claim 22, wherein the information identifies a format associated with each of the types of the application data.

25. The system of claim 22, wherein the information includes variables that relate to the different types of the application data.

26. The system of claim 1, wherein the information indicates a timing of the scanning by the scanning subsystem.

27. The system of claim 1, wherein the information indicates whether the scanning by the scanning subsystem is optional.

28. The system of claim 1, wherein the information indicates whether the scanning by the scanning subsystem is mandatory.

29. The system of claim 1, wherein the information improves the timing of the scanning by the scanning subsystem.

30. The system of claim 1, wherein the information improves the accuracy of the scanning by the scanning subsystem.

31. A platform-independent method for use with a mobile communication device, comprising:

communicating via a wireless network utilizing a mobile communication device including an operating system and an application program installed thereon, the application program adapted for performing tasks utilizing the mobile communication device;

scanning application data relating to the tasks performed by the application program, utilizing a platform-independent scanning subsystem in communication with the operating system of the mobile communication device; and interfacing the operating system and the scanning subsystem utilizing a platform-independent application program interface;

wherein the platform-independent application program interface includes an abstract library for porting the platform-independent scanning subsystem to the mobile communication device and associated operating system;

wherein the application program communicates information relating to the application data to the scanning subsystem to facilitate the scanning by the scanning subsystem.

32. A platform-independent computer program product for use with a mobile communication device, comprising:

computer code for communicating via a wireless network utilizing a mobile communication device including an operating system and an application program installed thereon, the application program adapted for performing tasks utilizing the mobile communication device;

computer code for scanning application data relating to the tasks performed by the application program, utilizing a platform-independent scanning subsystem in communication with the operating system of the mobile communication device; and computer code for interfacing the operating system and the scanning subsystem utilizing a platform-independent application program interface;

wherein the platform-independent application program interface includes an abstract library for porting the platform-independent scanning subsystem to the mobile communication device and associated operating system;

wherein the application program communicates information relating to the application data to the scanning subsystem to facilitate the scanning by the scanning subsystem.

* * * * *